(12) United States Patent
Graves et al.

(10) Patent No.: US 7,079,772 B2
(45) Date of Patent: Jul. 18, 2006

(54) OPTICAL SIGNAL GENERATOR WITH STABILIZED CARRIER FREQUENCY OUTPUT

(75) Inventors: Alan F. Graves, Kanata (CA); Dominic J. Goodwill, Kanata (CA); John H. Watkins, Ottawa (CA)

(73) Assignee: Nortel Networks Limited, St-Laurent (CA)

( * ) Notice: Subject to any disclaimer, the term of this patent is extended or adjusted under 35 U.S.C. 154(b) by 902 days.

(21) Appl. No.: 09/892,492

(22) Filed: Jun. 28, 2001

(65) Prior Publication Data

US 2002/0181062 A1   Dec. 5, 2002

Related U.S. Application Data

(60) Provisional application No. 60/294,919, filed on Jun. 1, 2001.

(51) Int. Cl.
*H01S 3/00* (2006.01)
*H01S 3/10* (2006.01)
*H04B 10/20* (2006.01)
*H04J 14/08* (2006.01)

(52) U.S. Cl. ............................. 398/95; 372/23; 372/29; 372/32

(58) Field of Classification Search ................... 398/95
See application file for complete search history.

(56) References Cited

U.S. PATENT DOCUMENTS

| | | | | |
|---|---|---|---|---|
| 3,670,166 A | * | 6/1972 | Kaminow | 398/101 |
| 4,777,664 A | * | 10/1988 | Khoe | 398/67 |
| 4,842,358 A | * | 6/1989 | Hall | 385/12 |
| 5,387,992 A | * | 2/1995 | Miyazaki et al. | 398/95 |
| 6,134,253 A | * | 10/2000 | Munks et al. | 372/32 |
| 6,512,619 B1 | * | 1/2003 | Fuse | 398/187 |
| 6,532,099 B1 | * | 3/2003 | Fuse | 359/278 |
| 6,643,470 B1 | * | 11/2003 | Iida et al. | 398/187 |
| 2003/0035183 A1 | * | 2/2003 | Seto et al. | 359/173 |

* cited by examiner

*Primary Examiner*—Chau Nguyen
*Assistant Examiner*—Cynthia L. Davis

(57) ABSTRACT

Method and apparatus for stabilizing an optical carrier frequency of a generated carrier signal with respect to a target carrier frequency. The apparatus includes a multi-channel optical filter for filtering the generated carrier signal, thereby to provide a first filtered optical signal and a second filtered optical signal, each filtered optical signal including the portion of the generated carrier signal contained in a pass band surrounding a respective channel center frequency. The apparatus also includes a detection unit for determining an indication of a characteristic of the target carrier frequency in the first and second filtered optical signals, as well as a control unit for adjusting the optical carrier frequency of the generated carrier signal as a function of the difference in the indication of the characteristic of the target carrier frequency in the first and second filtered optical signals.

27 Claims, 16 Drawing Sheets

OPTICAL SIGNAL GENERATOR WITH STABILIZED CARRIER FREQUENCY OUTPUT

CROSS-REFERENCES TO RELATED APPLICATIONS

This application claims the benefit of U.S. Provisional Application No. 60/294,919 to Graves et al., filed on Jun. 1, 2001.

FIELD OF THE INVENTION

The present invention relates generally to optical communications networks and, more particularly, to techniques for controlling the frequency of optical carrier signals used in such networks.

BACKGROUND OF THE INVENTION

In a modern optical communications network, multiple optical carriers transport digital traffic between access multiplexers at the edges of the network and photonic switch nodes located at strategic points within the core of the network. The link between a particular access multiplexer and a particular photonic switch node may be adapted to run only one wavelength per fiber or it may adhere to a multi-wavelength carrier frequency plan with typically 400–500 GHz spacing (referred to as "Sparse DWDM" since, although the individual optical carriers are generated with the required stability for DWDM transmission, they are widely spaced to create a known sparse population of the DWDM grid). Despite the low concentration of optical carriers on a given link, however, each modulated optical carrier transmitted by the access multiplexer has to appear at a precisely controlled optical frequency. This is because upon receipt at the photonic switch node, signals may be multiplexed together by a process of interleaving into a true DWDM stream for transmission through the core DWDM trunking network to other access multiplexers or to a core node router without undergoing any wavelength conversion.

The set of acceptable wavelengths for the optical carriers is known as the interoffice trunking wavelength plan, which has a narrower grid in order to achieve the large payload capacity of a high number of optical carriers on each fiber. This spacing is generally on the order of 100–200 GHz or less, and 100 GHz will be assumed here for simplicity. To facilitate interoperability, interoffice trunking wavelength plans are typically specified by the International Telecommunications Union (ITU). In order for a modulated optical carrier to be transmittable from one access multiplexer directly across a DWDM network to another access multiplexer or core node router without undergoing wavelength conversion, the optical carrier has to be precise to a small part of the DWDM grid, possibly to within at +/−1–3 GHz for a 100 GHz grid, and even tighter tolerances for a closer optical grid spacing.

A conventional approach to providing precisely controlled optical signal sources would consist of placing very precise and necessarily tunable optical sources at each access multiplexer. However, this is not only expensive, but is especially difficult to implement due to the location of the access multiplexers and their isolation from any reference, requiring it to make use of a self-contained and necessarily tunable or provisionable high precision source. Thus, the solution is in this case expensive and unreliable, as the number of sources scattered throughout the network is very large and thus the probability of a malfunction or mis-programming of a remoted function is higher.

If, on the other hand, unmodulated optical carriers were distributed to the access multiplexer from a centralized source, only to be turned around and modulated before being sent to the photonic switching node, then it is conceivable that all the necessary optical carriers could be generated at a single location under tightly controlled conditions and assembled into the necessary groups for distribution in specific appropriate groups to match access architectures, modularities, optical carrier plans, etc. This would permit the generation of optical wavelengths that are sufficiently precise in optical frequency such that optical carriers received at the photonic switch nodes could be directly coupled into the interoffice trunking wavelength plan, as required.

Thus, in a photonic switch node hosting, for example, 500 access-side optical carrier ports, each potentially associated with an access multiplexer, and utilizing a 5 phase, 8 channel sparse-DWDM plan mapping over a 40-channel interoffice trunking wavelength plan, 40 centrally located optical sources with appropriate buffering, amplification and splitting could do the work of 500 tunable sources further out in the access multiplexers. Furthermore, the technical requirements for locking 40 devices would be far less complex and far less costly than those for an individual tunable optical carrier locking system at each access multiplexer. Clearly, therefore, economies of scale can be achieved by distributing the wavelengths from a central point. In addition, the wavelengths could be generated in a benign environment and could be readily locked to grid, including locked to any reference wavelength distributed as a network master reference.

SUMMARY OF THE INVENTION

According a broad aspect, the invention provides an apparatus for stabilizing an optical carrier frequency of a generated carrier signal with respect to a target carrier frequency. The apparatus includes a multi-channel optical filter for filtering the generated carrier signal, thereby to provide a first filtered optical signal and a second filtered optical signal, each filtered optical signal including the portion of the generated carrier signal contained in a pass band surrounding a respective channel center frequency. The apparatus also includes a detection unit for determining an indication of a characteristic of the target carrier frequency in the first and second filtered optical signals, as well as a control unit for adjusting the optical carrier frequency of the generated carrier signal as a function of the difference in the indication of the characteristic of the target carrier frequency in the first and second filtered optical signals.

According to another broad aspect, the invention provides an optical signal generator, including an optical source adapted to generate an optical signal containing at least one carrier signal at a respective generated carrier frequency that is adjustable by a corresponding frequency control signal, each carrier signal being associated with a respective target carrier frequency. The optical signal generator also includes a multi-channel optical filter having a filter input port connected to the optical source and having a plurality of filter output ports, each filter output port being associated with a respective optical channel having a pass band surrounding a respective channel center frequency.

The optical signal generator also includes, for at least one target carrier frequency, a first and a second detection unit each associated with the target carrier frequency and connected to different ones of the filter output ports, each detection unit associated with a particular target carrier frequency being adapted to output an indication of a characteristic of the particular target carrier frequency in the optical signal present at the filter output port to which the detection unit is connected.

The optical signal generator further includes a control unit connected to the detection units and to the optical source, the control unit being operable to generate the frequency control signal corresponding to a particular carrier signal as a function of the output of the detection units associated with the target carrier frequency associated with the particular carrier signal, thereby to align the generated carrier frequency of the particular carrier signal with the target carrier frequency associated with the particular carrier signal.

The invention may be summarized according to yet another broad aspect as a method of stabilizing an optical carrier frequency of a generated carrier signal with respect to a target carrier frequency. The method includes filtering the generated carrier signal to provide a first filtered optical signal and a second filtered optical signal, each filtered optical signal including the portion of the generated carrier signal contained in a pass band surrounding a respective channel center frequency. The method also includes determining an indication of a characteristic of the target carrier frequency in the first and second filtered optical signals. The method further includes adjusting the optical carrier frequency of the generated carrier signal as a function of the difference in the indication of the characteristic of the target carrier frequency in the first and second filtered optical signals.

The invention may also be summarized broadly as a computer readable storage medium containing a program element for execution by a computing device to implement the above method.

According to still another broad aspect, the invention may be summarized as an apparatus for stabilizing an optical carrier frequency of a generated carrier signal with respect to a target carrier frequency. The apparatus includes a detection module adapted to receive a first filtered optical signal and a second filtered optical signal, each filtered optical signal including the portion of the generated carrier signal contained in a pass band surrounding a respective channel center frequency, the detection module further adapted to determine an indication of a characteristic of the target carrier frequency in the first and second filtered optical signals. The apparatus also includes a control module for adjusting the optical carrier frequency of the generated carrier signal as a function of the difference in the indication of a characteristic of the target carrier frequency in the first and second filtered optical signals.

These and other aspects and features of the present invention will now become apparent to those of ordinary skill in the art upon review of the following description of specific embodiments of the invention in conjunction with the accompanying drawings.

DETAILED DESCRIPTION OF THE PREFERRED EMBODIMENTS

Figure 1:
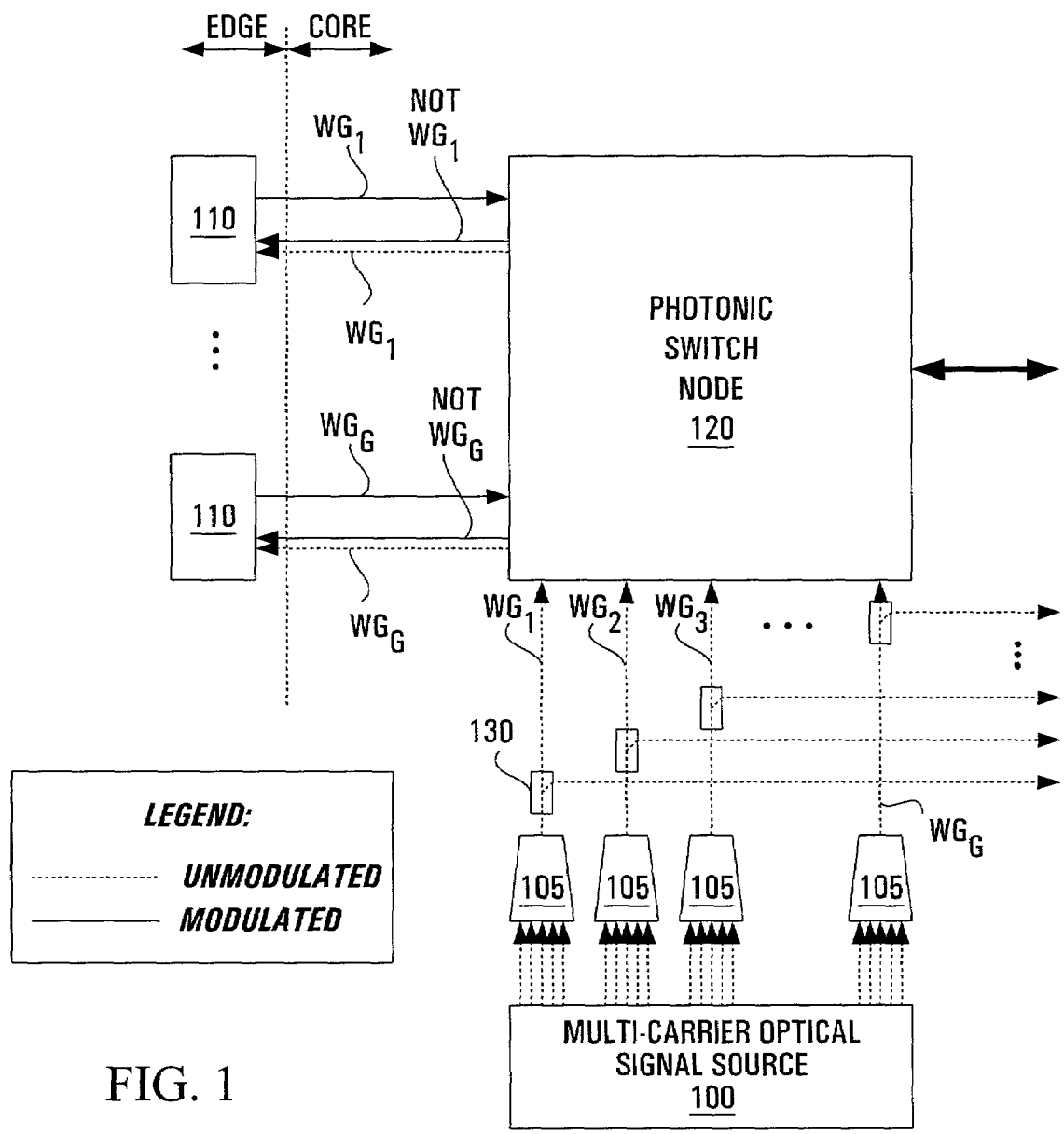
FIG. 1 shows in schematic form part of a communications network utilizing a multi-carrier optical signal source in accordance with the present invention.

FIG. 1 shows part of a network in which access multiplexers 110 communicate with a photonic switch node 120 over an optical medium such as optical fiber. Individual optical carriers are used to transport modulated data from the access multiplexers 110 to the photonic switch node 120 (i.e., in the "edge-to-core" direction) and from the photonic switch node 120 to the access multiplexers 110 (i.e., in the "core-to-edge" direction), as well as across the core network (via intermediate photonic switches) to far end equipment such as remotely located access multiplexers.

In one example embodiment, a total of N=40 optical carriers on the standard ITU 100 GHz grid may be used in the core network. This may be extended into the access portion of the network or, alternatively, the total capacity of the core DWDM grid may be shared over multiple access fibers, each carrying a lesser number of optical carriers (referred to as "sparse" DWDM or S-DWDM). In a network of this form, utilizing direct optical (i.e., photonic) switching at the transmitted optical carrier wavelengths, the optical carriers must always be at a precise enough optical frequency that their spectral lines and modulation sidebands fall within the respective ITU DWDM grid tolerances.

The optical carriers used to transport modulated data in the edge-to-core direction are transmitted in unmodulated form from the photonic switch node 120 to the access multiplexers 110 so that they can be modulated with data by the access multiplexers 110 and sent back towards the photonic switch node 120. In order to prevent these unmodulated optical carriers from overwriting modulated optical carriers travelling to the access multiplexers 110 at the same time, an access S-DWDM frequency plan may be used which establishes specific relationships between wavelength allocation in both directions of communication. The simplest of these is that every core-to-edge modulated optical carrier that carries an odd channel number on the ITU grid is associated with the next higher even numbered wavelength for the edge-to-core path and that every even numbered core-to-edge wavelength is associated with the next lower odd edge-to-core wavelength. This ensures full use of a bi-directional DWDM core network, with no wavelength wastage, while preventing overwriting of the edge-to-core data stream with the unmodulated optical carrier used to generate the associated edge-to-core optical carrier.

More generally, a set of G wavelength groups $WG_1$, $WG_2, \ldots, WG_G$ may be defined. In one embodiment, group $WG_g$ may include optical carriers $g+(k \times N/G)$, for $0 \leq g \leq G-1$. Thus, where N=40 and G=8, group $WG_1$ would include optical carriers 1, 6, 11, 16, 21, 26, 31 and 36, group $WG_2$ would include optical carriers 2, 7, 12, 17, 22, 27, 32 and 37, and so on. For a given access multiplexer 110, different wavelength groups are used for transporting modulated data in the two directions of transmission. In this way, unmodulated optical carriers which are part of the access multiplexer's edge-to-core wavelength group will not interfere with the modulated optical carriers travelling simultaneously towards the access multiplexer 110.

The same applies to other access multiplexers 110 in the network and thus it should be appreciated by those skilled in the art that the photonic switching node 120, as part of its functionality, effectively acts as a central distribution hub for unmodulated optical carriers to the access multiplexers 110. These optical carriers can be coupled in to the access path by action of the switch core, though this can be wasteful of switch ports, or they can be coupled in at the output point of the downstream portion of an access port card, either by consuming ports on the downstream S-DWDM multiplexers (turning them from 5 phases of 8 channels into five phases of 8+8 channels) or the optical carriers can be generated in the multi-lambda source as five groups of 8 channels of optical carriers, which are then distributed to each and every port card for coupling into the downstream access output beyond the S-DWDM multiplexer.

In any event, the unmodulated optical carriers must be generated at precisely controlled wavelengths so that (a) in unmodulated form, they do not interfere with modulated optical carriers as they are sent to the access multiplexers 110, (b) upon modulation by the access multiplexers 110, they do not interfere with modulated optical carriers from other wavelength groups as they are switched by the photonic switch node 120, and (c) the entire modulated signal on each optical carrier (including upper and lower sidebands) falls within the passband of the wavelength division multiplexing and demultiplexing equipment.

In order to permit the generation of the required number of unmodulated optical carriers at precisely controlled wavelengths, the photonic switching node 120 comprises or is coupled to a multi-carrier optical signal source 100. In one example embodiment, the multi-carrier optical signal source 100 generates N=40 optical carriers on the standard ITU 100 GHz grid. However, it is within the scope of the present invention to generate other numbers of optical carriers in accordance with any suitable spectral plan. It should further be understood that the present invention is also applicable to the stable generation of a single optical carrier.

The optical carriers generated by the multi-carrier optical signal source 100 are grouped or multiplexed by a set of multiplexers 105 in accordance with a wavelength plan. If interleaving of optical carriers is required, this functionality may be supplied by a coupler or interleaver device (not shown). A resulting group of optical carriers may then fed through an amplifier/splitter combination 130, which may be built from discrete components or may comprise an amplifying splitter such as an amplifying 8-way splitter available from TEEM Photonics, Grenoble, France.

The purpose of the amplifier/splitter combination 130, if used, is to allow the optical carriers in the corresponding group to be sent towards different access multiplexers 110 in different parts of the network. This permits re-use of the wavelength plan within the network. The splitter may be omitted, in which case the amplifier/splitter combination 130 may simply include an amplifier with a flat gain/frequency response.

Figure 2A:
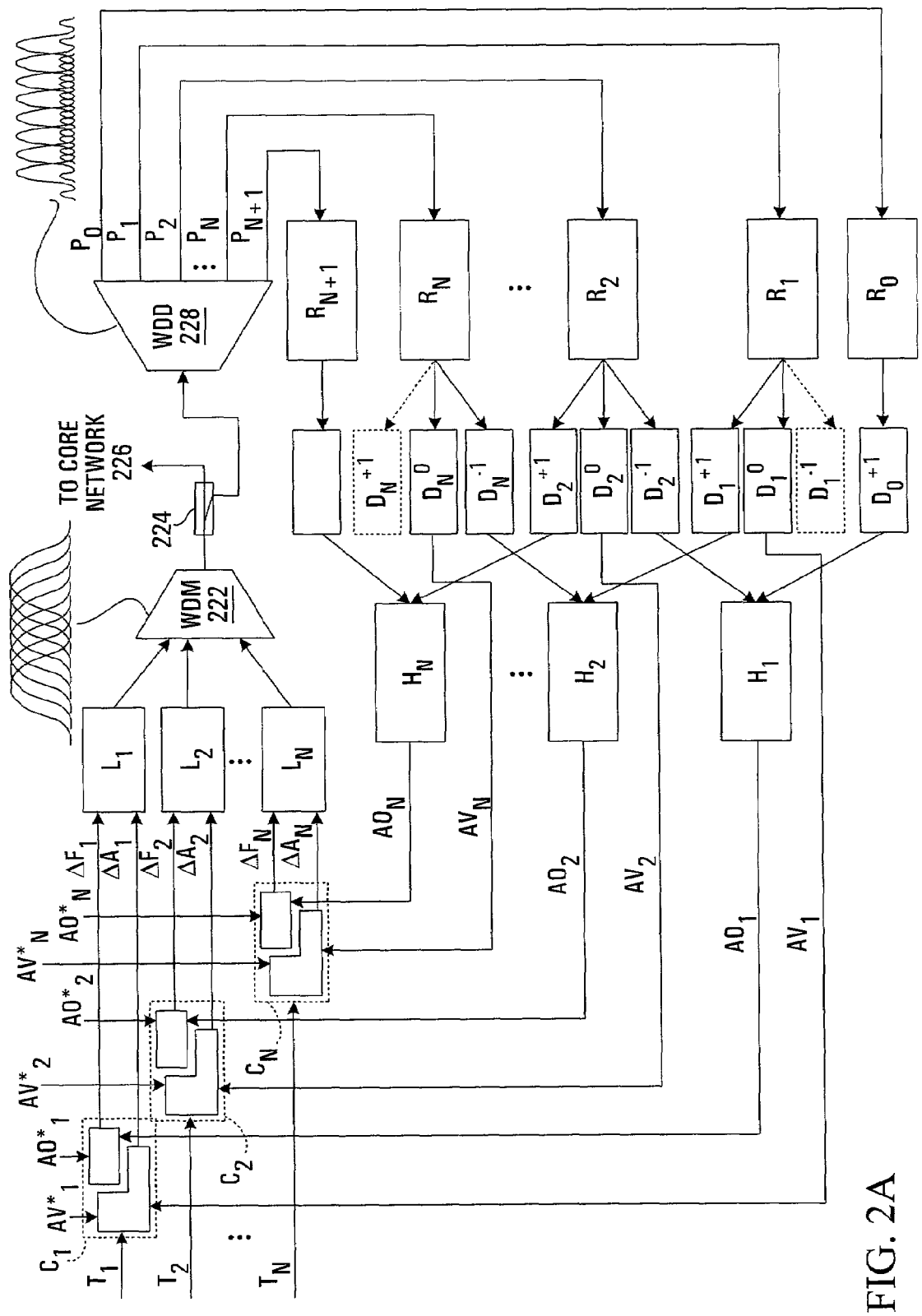
FIG. 2A shows in schematic form a multi-carrier optical signal source in accordance with a first embodiment of the present invention, producing a single full spectrum DWDM optical carrier "comb" output.

Different embodiments of the multi-carrier optical signal source 100 are described herein below with reference to FIGS. 2–14. FIG. 2A shows a first embodiment of the multi-carrier optical signal source of the present invention, comprising a plurality of lasers $L_i$, each associated with a respective optical carrier i and a system frequency $F^*_i$, where i ranges from 1 to N. The N required system frequencies $F^*_i$ are laid out in accordance with a specific optical frequency plan. A non-limiting example of a possible optical frequency plan consists of N=40 optical carriers with system frequencies evenly spaced apart by 100 GHz, thereby forming a grid, suitably an ITU-specified grid.

Laser $L_i$ lases at a controllable carrier frequency $F_i = F_i^{open} + \Delta F_i$ and at a controllable carrier amplitude (intensity) $A_i = A_i^{nom} + \Delta A_i$, where $F_i^{open}$ is the open loop frequency of laser $L_i$ in the absence of feedback control and $A_i^{nom}$ is the amplitude resulting from the application of a predetermined bias current (also known as "drive current") to laser $L_i$.

The open loop frequency $F_i^{open}$ is approximately equal to a corresponding one of the required system frequencies $F^*_i$. However, due to various factors, the open loop frequency $F_i^{open}$ may deviate from the corresponding required system frequency $F^*_i$; still, $F_i^{open}$ is always assumed to remain in the "neighbourhood" of $F^*_i$. As an example of an implementation to support this assumption, a Fabry-Perot laser with an integrated Bragg fiber grating in series therewith is known to have a free-running frequency stability of +/−18 GHz, thereby resulting in a free grid spacing ranging over 64–136 GHz, against an objective of a spacing of substantially 100 GHz. Nevertheless, in the event that the "neighbourhood"

assumption is not satisfied, the present invention contemplates other embodiments, which are described later on in greater detail.

To lock the carrier frequency $F_i$ to the corresponding required system frequency $F^*_i$, the present invention as embodied in FIG. 2A (or FIG. 2B) provides a frequency control feedback loop for each laser $L_i$ under the control of a respective laser controller $C_i$. The frequency control loop utilizes an array waveguide (AWG) dense wavelength division demultiplexer (WDD) 228 with a precisely known amplitude vs. frequency response in each passband lobe, including side lobes, in order to provide precise conversion from optical frequency to amplitude slope.

The frequency control loop involves laser controller $C_i$ generating a frequency adjustment signal $\Delta F_i$ by evaluating the difference in amplitude of two signals derived from side lobe responses of the WDD 228, which interact to operate as frequency discriminator. To this end, and as will be described in further detail later on, an (electrical) tone frequency $T_i$ is associated with optical carrier i, $1 \leq i \leq N$. The tones are used to discriminate the contributions from each of a plurality (e.g., three) of optical carriers in each passband of the WDD device 228. In one embodiment, for the $i^{th}$ passband of the WDD device 228, a relatively strong contribution from optical carrier i will be received in the center of the passband, whereas a relatively weak contribution from optical carrier i-1 will be received at the lower edge of the passband and another relatively weak contribution from optical carrier i+1 will be received at the upper edge of the passband.

As will be described in greater detail later on, all three contributions (from optical carriers i-1, i and i+1) arrive at a common opto-electronic receiver, and thus the relative contributions of the three optical carriers cannot be distinguished using d.c. or power measurement techniques alone. However, by associating each optical carrier with a tone, there will appear three tones $T_{i-1}$, $T_i$, $T_{i+1}$ of differing powers, representing optical carriers i-1, i and i+1, respectively. The method for discriminating the actual operating frequency of laser $L_i$, associated with optical carrier i, includes measuring the power of tone $T_i$ in lobe i-1 and the power of tone $T_i$ in lobe i+1 and comparing the received power of these two tone signals. This results in a measured amplitude offset, denoted $AO_i$, which is then compared to a design-dependent offset $AO^*_i$ associated with optical carrier i. In one embodiment, the design-dependent offset $AO_i^*$ is zero and the discriminator is said to be balanced when optical carrier i sits at a carrier frequency $F_i$ such that exactly equal signal levels are measured in the two adjacent side lobes.

The frequency adjustment signal $\Delta F_i$ feeds suitable circuitry within laser $L_i$ for shifting $F_i^{open}$ by $\Delta F_i$, thereby creating $F_i$. Such circuitry is known in the art and may include a third electrode for applying a voltage or current to laser $L_i$ so as to operate upon either the lasing channel parameters in order to shift the frequency $F_i$, or upon a heater/cooler in order to change the thermal equilibrium of laser $L_i$, thus exploiting its temperature coefficient of optical lasing frequency. In other embodiments, such circuitry may act directly upon the drive current through laser $L_i$. The method used will be dependent on the device construction and on the operational requirements of the invention.

To maintain the carrier amplitude $A_i$ at a desired level, the present invention as embodied in FIG. 2A (or FIG. 2B) provides an amplitude control loop for each laser $L_i$ under the control of a respective laser controller $C_i$. The amplitude control loop involves laser controller $C_i$ generating an amplitude adjustment signal $\Delta A_i$ from a respective measured carrier amplitude $AV_i$, from a desired carrier amplitude $AV^*_i$ and from a low-level modulation signal at an (electrical) tone frequency $T_i$ associated with optical carrier i.

The amplitude adjustment signal $\Delta A_i$ generated by laser controller $C_i$ contains a d.c. component (which is a function of the measured carrier amplitude $AV_i$ and the desired carrier amplitude $AV^*_i$) and an a.c. component (at the tone frequency $T_i$). The amplitude adjustment signal $\Delta A_i$ is fed to suitable circuitry within laser $L_i$ for adding $\Delta A_i$ to $A_i^{nom}$, thereby to create $A_i$. By way of a non-limiting example, the modulation depth, defined as the magnitude of $\Delta A_i$ relative to d.c. component of $A_i$, can range from 0.2 to 2%. However, it should be understood that any modulation depth could be used which does not cause a substantial increase in laser line width or reduction in high-speed receiver eye opening, and which also results in an adequate discrimination sensitivity in the frequency control loop.

By way of example, later described with reference to FIG. 13, alternative instantiations can exist where laser $L_i$ is not itself power modulated with tone $T_i$, but rather its output is tapped by a 95%/5% splitter. The 5% leg of the splitter is provided with a series tone modulator. The set of modulated tapped components are combined together via a passive splitter or broad-lobe WDM device, to create an input to the WDD device 228. While slightly more complex, this approach has the advantages that (i) no tone or line width broadening due to the tone is present at the 95% leg of the splitter; (ii) the output modularity or granularity, in terms of whether the output is individual optical signals, S-DWDM multiplexed sparse combs or a dense comb for DWDM is independent of the control loop components; and (iii) the constraints on the level of modulation of tone $T_i$ are relaxed, allowing greater modulation depth and hence better discriminator sensitivity.

Each laser thus outputs a single-carrier optical signal which is fed to a common wavelength division multiplexing (WDM) device 222. The WDM device 222 combines the N single-carrier optical signals into a composite, multi-carrier optical signal. The output of the WDM device 222 is connected, via a splitter 224, both to the core network 226 and to the WDD device 228, which has specific properties dependent upon the detailed design of the locking control system of which several embodiments will be described herein below. The splitter 224 may suitably divert between 5 and 10% of the optical power of the multi-carrier optical signal towards the WDD device 228, while feeding the rest of the power to the core network 226. Of course, those skilled in the art will appreciate that other power splitting ratios are possible.

Figure 2B:
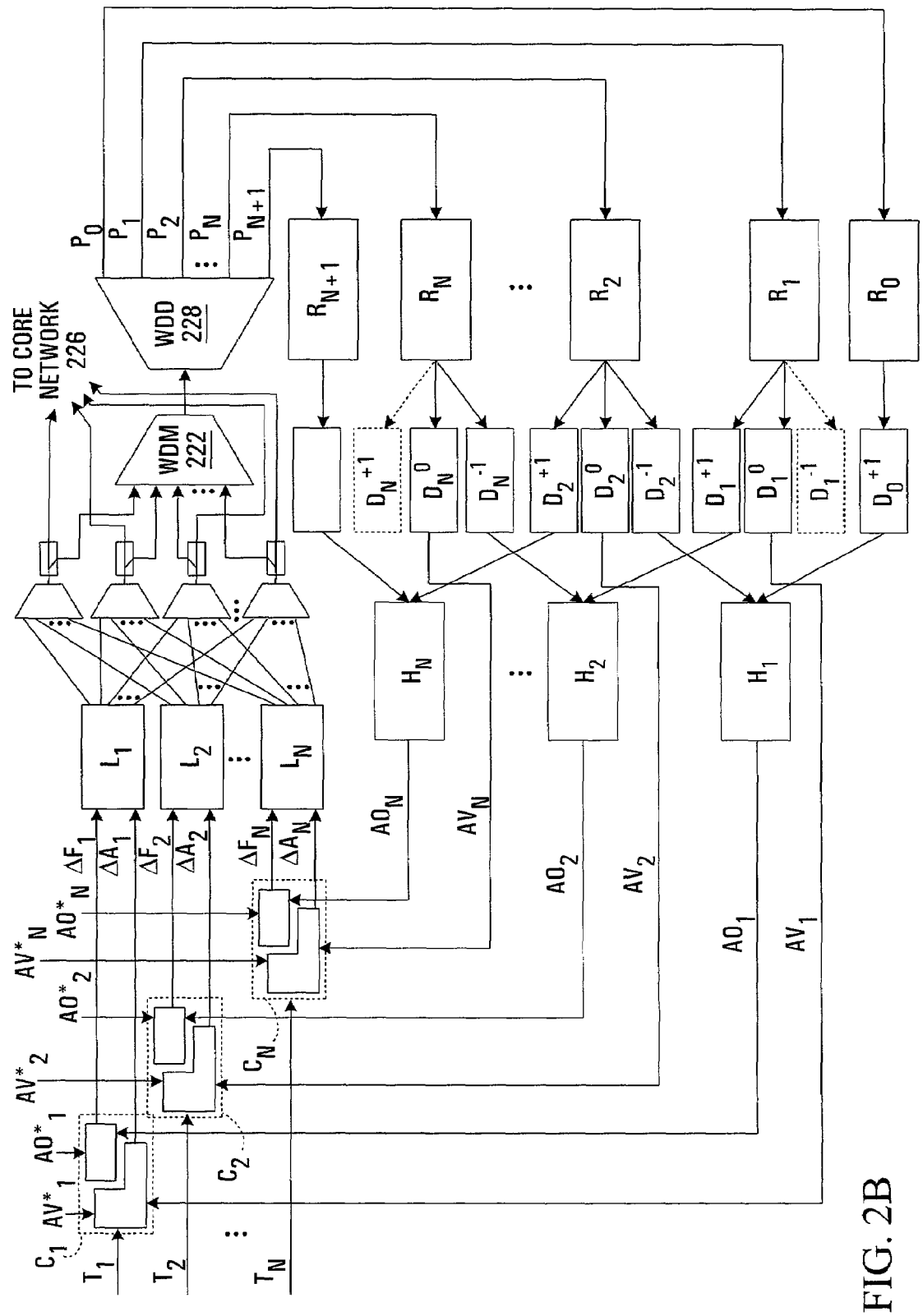
FIG. 2B shows in schematic form a multi-carrier optical signal source in accordance with a variant of the first embodiment of the present invention, producing a full complement of S-DWDM optical carrier "comb" outputs in complete S-DWDM groups.

In an alternative embodiment, as shown in FIG. 2B, if the optical carriers are to be assembled into groups of optical carriers by a plurality of smaller multiplexers (instead of a into a single multi-carrier optical signal by the WDM device 222), then splitters similar to splitter 224 could be located at the outputs of these smaller multiplexers and could feed a combiner (or multiplexer) which would then feed the WDD device 228.

The WDD device 228 is substantially a multi-channel optical filter with precisely known response characteristics. In the embodiment of FIG. 2, the WDD device 228 has N+2 output ports $P_i$, $0 \leq i \leq N+1$, one for each of N+2 optical channels of width 100 GHz. Each port is associated with an optical channel having an optical pass band centered about a unique channel center frequency $F_{ch,i}$. In the specific embodiment of FIG. 2, the channel center frequencies $F_{ch,i}$ (which are associated with the N middle ports $P_i$, $1 \leq i \leq N$)

correspond to system frequencies $F^*_i$. The two other ports of the WDD device 228, namely $P_0$ and $P_{N+1}$, are associated with optical channels centered about frequencies $F^*_1-100$ GHz and $F^*_N+100$ GHz, respectively. The usefulness of ports $P_0$ and $P_{N+1}$ will become apparent from the discussion herein below.

Advantageously, the passband lobes of the WDM device 222 may be chosen to be significantly wider than the passband lobes of the WDD device 228, so that the WDD device 228 will dominate the discrimination process, since the two components' responses are additive. A suitable WDM device 222 is a FATMux part from Lightwave Micro-Systems.

Figure 3A:
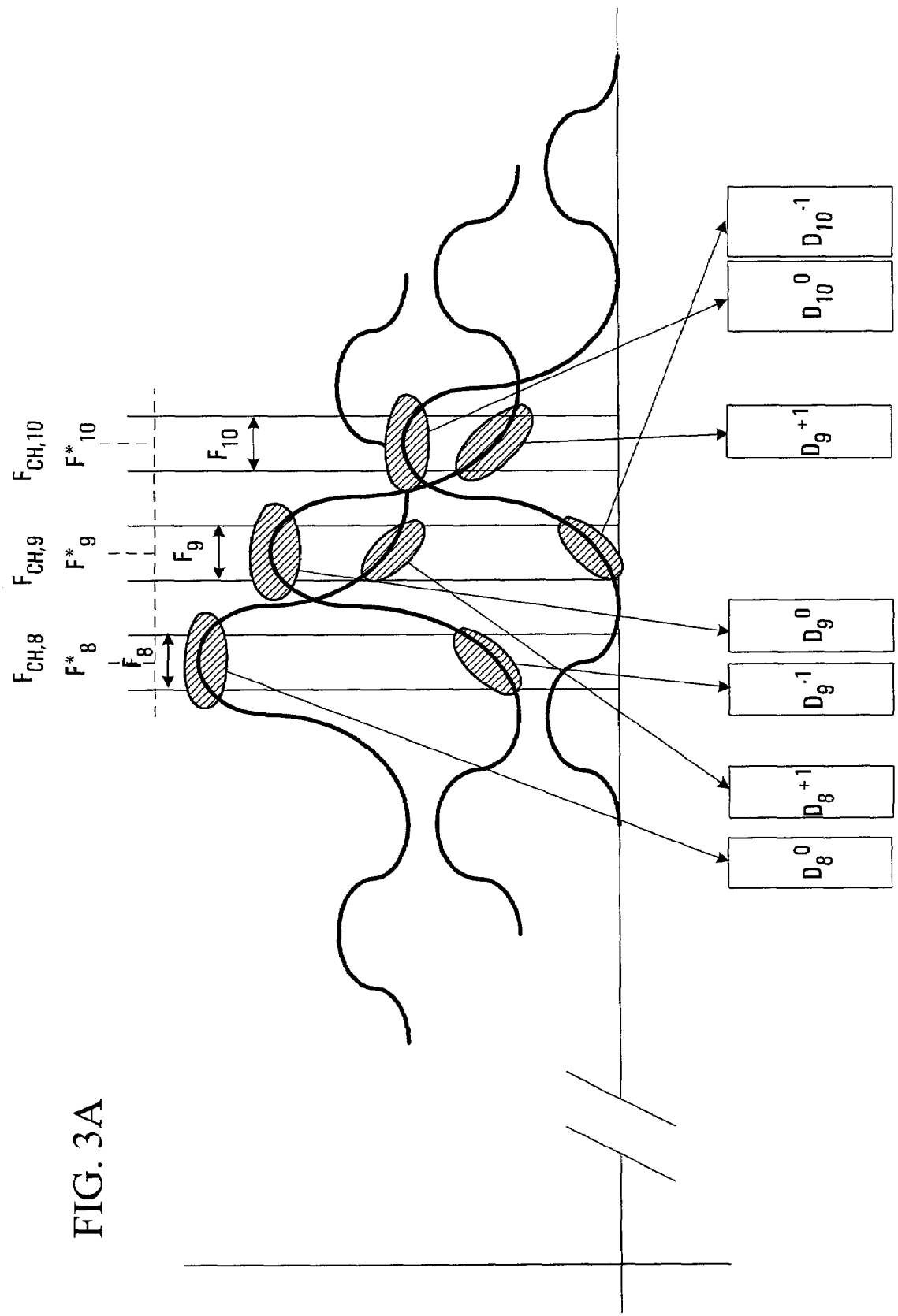
FIGS. 3A and 3B illustrate example individual channel responses for part of the overall response of two example wavelength division demultiplexing devices suitable for use with the multi-carrier optical signal source of FIG. 2A and the positions of various optical carrier spectral lines within their passbands when the multi-carrier optical signal source is stabilized.
Figure 3B:
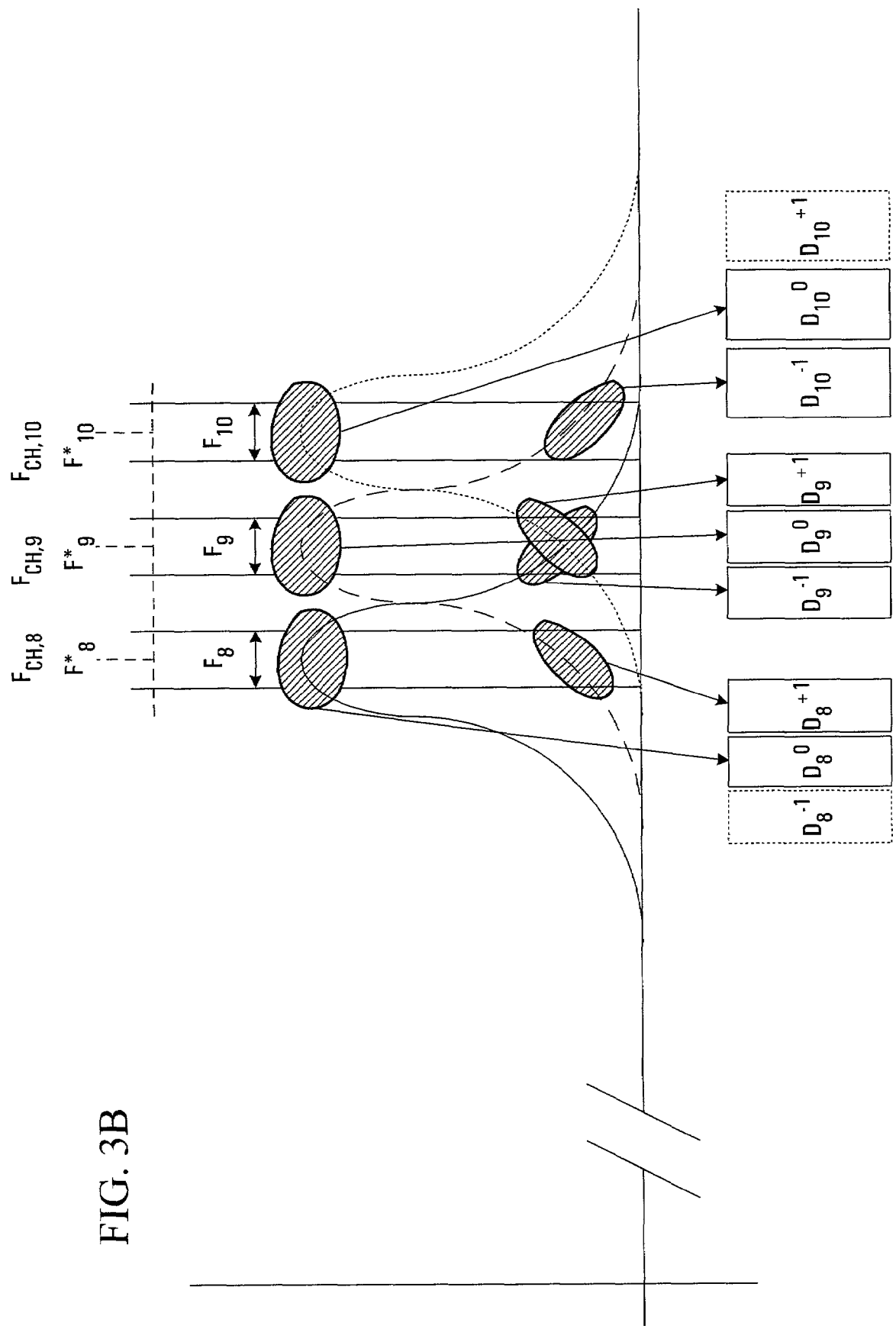

FIG. 3A shows, by way of a non-limiting example, the response of three adjacent optical channels, corresponding to ports $P_8$, $P_9$ and $P_{10}$ of the WDD device 228 and centered about frequencies $F_{ch,8}$, $F_{ch,9}$ and $F_{ch,10}$. For the WDD device 228 in the embodiment of FIG. 2, channel center frequencies $F_{ch,8}$, $F_{ch,9}$ and $F_{ch,10}$ would correspond to system frequencies $F^*_8$, $F^*_9$ and $F^*_{10}$, respectively. It is seen that the response of each optical channel overlaps the other and has a shape consisting primarily of a main lobe and symmetrically disposed side lobes. Each side lobe is located at a distance away from the main lobe such that the response has opposite slopes when measured at the center frequencies of the two adjacent optical channels. Each of the remaining optical channels (not shown) has a similarly shaped response, but would be shifted by 100 GHz so that it would be centered about the appropriate system frequency $F^*_i$ associated with optical carrier i.

Of course, it should be understood that different WDD devices can be used and will lead to different embodiments of the invention, depending on the inter-channel spacing, on the shape of each individual channel response and on variations in the response shape among optical channels. Specific embodiments of the present invention illustrating some of these possibilities are provided later on.

Continuing with the description of FIG. 2, each output port $P_i$ ($0 \leq i \leq N+1$) of the WDD device 228 is connected to a respective low-bandwidth optical receiver, denoted $R_i$ for $0 \leq i \leq N+1$, which is adapted to provide opto-electronic conversion functionality. Each of the "middle" optical receivers (i.e., those receivers $R_i$ for which $1 \leq i \leq N$) outputs a low-bandwidth electrical version of the portion of the multi-carrier optical signal which falls in the passband of port $P_i$ on the WDD device 228, centered about the corresponding channel center frequency $F_{ch,i}$ which, in the embodiment of FIG. 2, corresponds to system frequency $F^*_i$. Receivers $R_0$ and $R_{N+1}$ output a low-bandwidth version of the portion of the multi-carrier optical signal centered about $F^*_1-100$ GHz and $F^*_N+100$ GHz, respectively.

The portion of the multi-carrier optical signal centered about channel center frequency $F_{ch,i}$ will contain the optical carrier at carrier frequency $F_i$ (which is to be locked to the corresponding system frequency $F^*_i$), a controlled component from each of the adjacent optical carriers at around $F_i+100$ GHz and $F_i-100$ GHz (which are to be used in conjunction with the controlled components received in other lobes to provide a frequency locking mechanism), as well as residual noise or breakthrough components from other more distant optical carriers, depending on the details of the response characteristics of the WDD device 228. As will be seen herein below, the difference between the secondary lobe or side-lobe component of each adjacent optical carrier (those in the neighbourhood of system frequencies $F^*_{i+1}$ and $F^*_{i-1}$) determines the degree to which optical carrier i is centered about corresponding system frequency $F^*_i$.

Each of the middle optical receivers $R_i$ ($1 \leq i \leq N$) is connected to three tone detectors $D_i^{-1}$, $D_i^0$ and $D_i^{+1}$. Since laser $L_i$ radiates at a carrier frequency $F_i$ (which is in the neighbourhood of both the corresponding system frequency $F^*_i$ and the corresponding channel center frequency $F_{ch,i}$), and since the radiated signal contains a component at tone frequency $T_i$, it follows that the electrical signal at the output of optical receiver $R_i$ will also contain a component at tone frequency $T_i$. Accordingly, tone detector $D_i^0$ is adapted to measure the amplitude of tone frequency $T_i$ in the signal processed by receiver $R_i$. The output of tone detector $D_i^0$ is a used as the previously described measured carrier amplitude $AV_i$ which is fed to laser controller $C_i$ associated with optical carrier i.

Furthermore, it is noted that since the open loop frequency $F_i^{open}$ deviates from the corresponding system frequency $F^*_i$ (and the corresponding channel center frequency $F_{ch,i}$), the signals processed by neighbouring receivers $R_{i-1}$ and $R_{i+1}$ will initially contain an arbitary level of the tone frequency $T_i$. For exactly the same reason, the signal processed by receiver $R_i$ will initially detect an output with slightly more or slightly less of each of the tone frequencies $T_{i-1}$ and $T_{i+1}$ and, as will be seen herein below, these components will tend towards a low, balanced amplitude upon convergence of the frequency control loop. Accordingly, each pair of tone detectors $D_i^{-1}$ and $D_i^{+1}$ is adapted to measure the amplitude of tone frequencies $T_{i-1}$ and $T_{i+1}$, respectively, in the signal processed by receiver $R_i$.

Frequency discrimination is achieved as follows. In order to determine whether the signal received by each receiver $R_i$ is truly centered within the associated optical channel, a comparator $H_i$ is provided for each receiver $R_i$. Comparator $H_i$ has one input connected to the output of tone detector $D^{i-1+1}$ (which is connected to receiver $R_{i-1}$) and another input connected to the output of tone detector $D_{i+1}^{-1}$ (which is connected to receiver $R_{i+1}$) In other words, comparator $H_i$ compares the amplitude of the component at tone frequency $T_i$ of the optical signal in each of the adjacent optical channels. The output of each comparator $H_i$, $1 \leq i \leq N$, is the previously described measured amplitude offset $AO_i$, which is fed to laser controller $C_i$ associated with optical carrier i.

It is noted that comparators $H_1$ and $H_N$ are a special case because they require measurements performed outside the N middle optical channels. Specifically, comparator $H_1$ accepts one input from tone detector $D_2^{-1}$ and a second input from an additional tone detector $D_0^{+1}$ connected to receiver $R_0$ (centered about a frequency of $F^*_1-100$ GHz), while comparator $H_N$ accepts one input from tone detector $D_{N-1}^{+1}$ and a second input from an additional tone detector $D_{N+1}^{-1}$ connected to receiver $R_{N+1}$ (centered about a frequency of $F^*_N+100$ GHz).

Operation of the amplitude and frequency control loops involving controller $C_i$ is now described by way of a non-limiting example. Initially, under open loop conditions, controller $C_i$ sets the amplitude adjustment signal $\Delta A_i$ to a value such that laser $L_i$ radiates at a relatively low power level. At this low power level, the frequency control loop is used to tune the carrier frequency $F_i$ of laser $L_i$ to the appropriate system frequency $F^*_i$. Specifically, laser controller $C_i$ compares the measured amplitude offset $AO_i$ at the output of comparator $H_i$ to a desired offset $AO^*_i$. The result of this comparison is the frequency adjustment signal $\Delta F_i$, which is amplified and fed to suitable frequency correction circuitry in laser $L_i$.

The desired offset $AO^*_i$ depends on the frequency response of the WDD device 228 for each individual optical channel. For example, in the case where each main lobe is symmetric about the corresponding channel center frequency $F_{ch,i}$ and where channel center frequency $F_{ch,i}$ corresponds to system frequency $F^*_i$ (such as is the case with the individual channel responses of FIG. 3A), then the desired offset $AO^*_i$ is zero. That is to say, the carrier frequency $F_i$ is equal to the corresponding system frequency $F^*_i$ only when the amplitude of tone frequency $T_i$ is the same in the signal processed by receiver $R_{i-1}$ as it is in the signal processed by receiver $R_{i+1}$.

In other cases, the main lobes might not be symmetric about their channel center frequencies, but the shape of each response would be known in advance and hence it would be possible to determine the magnitude of the offset $AO^*_i$ which should exist between the amplitude of tone frequency $T_i$ in the signal processed by receiver $R_{i-1}$ and the amplitude of tone frequency $T_i$ in the signal processed by receiver $R_{i+1}$. Alternatively, a pre-set variable threshold offset could be applied to the comparators at manufacture to individually bring each optical carrier exactly "on-grid" thereby cancelling out any residual small errors due to WDD frequency response errors. Thereafter, one may rely on the frequency stability (with time) of the AWG technology used in the WDD device 228 to keep the optical carriers correctly aligned for the life of the equipment.

Once the carrier frequency $F_i$ has been adjusted to match the corresponding system frequency $F^*_i$, the next step is to set the amplitude $A_i$ using the amplitude control loop. To this end, laser controller $C_i$ compares the measured carrier amplitude $AV_i$ to a desired carrier amplitude $AV^*_i$ and the difference is used to create the d.c. component of the amplitude adjustment signal $\Delta A_i$. Specifically, the difference between $AV_i$ and $AV^*_i$ is amplified and becomes the control for the d.c. bias (or d.c. drive current) through laser $L_i$, thus causing it to lase at an optical power related to that drive current. This d.c. bias is combined with a small signal at tone frequency $T_i$ to produce the a.c. component of the amplitude adjustment signal $\Delta A_i$, thereby inducing a small amount of intensity modulation on the optical output of laser $L_i$ which, in turn, provides tone $T_i$ to the tone detectors $D_{i-1}^{+1}$, $D_i^0$, $D_{i+1}^{-1}$, via the WDD device 228 and the optical receivers $R_{i-1}$, $R_i$, $R_{i+1}$ in order to enable the optical frequency discrimination process.

At first, laser controller $C_i$ will detect a low power output based on the difference between $AV_i$ and $AV^*_i$ and, as a result, the amplitude adjustment signal $\Delta A_i$ will be steadily increased. This action may consequently skew the carrier frequency $F_i$, but because the latter is under control of the frequency feedback loop, any drift in the carrier frequency $F_i$ with respect to the corresponding system frequency $F^*_i$ will be cancelled out by a compensatory change to the frequency control conditions.

The exact technique for correcting carrier frequency $F_i$ using the frequency adjustment signal $\Delta F_i$ depends on the design of laser $L_i$. Any suitable technique can be used for this purpose, including changing the substrate temperature, changing the bias voltage on (or current through) a third electrode connected to a series cavity, etc. In the case of a thermally tuned laser, the frequency adjustment signal $\Delta F_i$ would be amplified and injected as a reference level into a Peltier cooler control circuit, causing an offset in the stabilized temperature of laser $L_i$. The magnitude of the adjustments would reduce to almost zero as laser $L_i$ tunes its frequency of optical radiation to the required system frequency $F^*_i$.

As has been mentioned herein above, other WDD devices with different channel response shapes from those illustrated in FIG. 3A are suitable for use with the present invention. For example, it is within the scope of the present invention to use a WDD device 228 having the characteristics shown in part in FIG. 3B. In this case, channel center frequencies $F_{ch,8}$, $F_{ch,9}$ and $F_{ch,10}$ are still identical to system frequencies $F^*_8$, $F^*_9$ and $F^*_{10}$, and the response of each optical channel overlaps the adjacent ones in the manner of FIG. 3A. However, in this case, the shape of each response consists of a single main lobe with distant well-suppressed or non-existent side lobes. Still, each response again has opposite slopes when measured at the center frequencies of the two adjacent optical channels. Each of the remaining optical channels (not shown) may have a similarly shaped response, but shifted by 100 GHz so that it would be centered about the appropriate system frequency $F^*i$ associated with optical carrier i. Operation of each laser controller $C_i$ is as described herein above.

A second embodiment of the multi-carrier optical signal source of the present invention is now described with reference to FIG. 4. This embodiment differs from the embodiment of FIG. 2 in that the WDD device (228 in FIG. 2, 428 in FIG. 4) now has main lobes that are still spaced at 100 GHz but are now offset by 50 GHz from the required optical grid frequencies $F^*_i$. This allows both frequency discrimination and amplitude measurements to be effected with a total of only two (rather than three) measurements per optical carrier.

Specifically, each of the lasers $L_i$ outputs a single-carrier optical signal which is fed to a common broad-lobed wavelength division multiplexing (WDM) device 222. The WDM device 222 combines the N single-carrier optical signals into a multi-carrier optical signal. The output of the WDM device 222 is connected, via a splitter 224, both to the core network 226 and to a wavelength division demultiplexing (WDD) device 428. The splitter 224 may suitably divert between 5 and 10% of the optical power of the multi-carrier optical signal towards the WDD device 428, while feeding the rest of the power to the core network 226. Of course, those skilled in the art will appreciate that other power splitting ratios are possible, as are other output optical carrier multiplex structures, for instance that illustrated in FIG. 2a.

The WDD device 428 is substantially a precise multi-channel optical filter. In the embodiment of FIG. 4, the WDD device 428 has N+1 output ports $P_i$, $0 \leq i \leq N$, one for each of N+1 optical channels of width 100 GHz. Each port is associated with an optical channel having an optical pass band centered about a unique channel center frequency $F_{ch,i}$. In the specific embodiment of FIG. 4, the channel center frequencies $F_{ch,i}$ (which are associated with the N middle ports $P_i$, $1 \leq i \leq N$) are offset from the system frequencies $F^*_i$ such that the peak responsivity of a given channel i occurs at some point (e.g., half way) between system frequencies $F^*_i$ and $F^*_{i+1}$. Port $P_0$ of the WDD device 428 is associated with an optical channel centered about frequency $F^*_1 - 50$ GHz.

Stated differently, system frequency $F^*_i$ will fall somewhere between channel center frequencies $F_{ch,i-1}$ and $F_{ch,i}$. Hence, by comparing the amplitude of tone $T_i$ as received in the two channels centered about channel center frequencies $F_{ch,i-1}$ and $F_{ch,i}$, a sensitive optical frequency discriminator can be produced. Since these tone components are only half as far away from the peak of the main lobe of channel center frequency $F_{ch,i}$ (when compared to the embodiment of FIG. 2), the detected amplitude levels for the components providing the discrimination function will be substantially higher, resulting in lower demands on the optical receivers and/or the need to tap less light at the output splitter 224.

Figure 5:
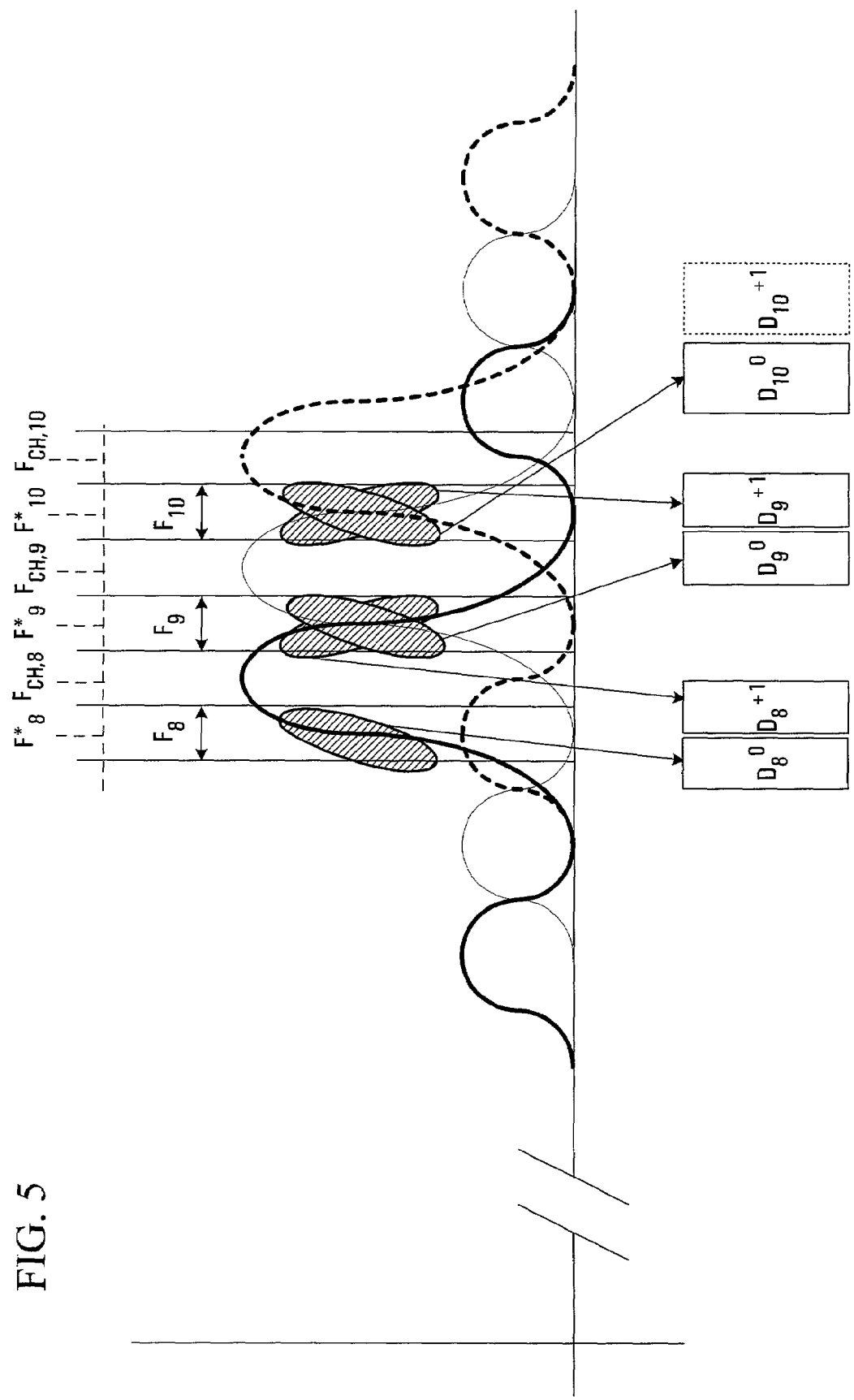
FIG. 5 illustrates example individual channel responses for part of the overall response of a wavelength division demultiplexing device suitable for use with the multi-carrier optical signal source of FIG. 4 and the positions of various optical carrier spectral lines within their passbands when the multi-carrier optical signal source is stabilized.

Reference is made to FIG. 5, wherein channel center frequencies $F_{ch,8}$, $F_{ch,9}$ and $F_{ch,10}$ are shown for the case where each channel has a main lobe and symmetrically disposed side lobes. As can be seen, since the main lobe of a given optical channel i is symmetric on either side of the channel center frequency $F_{ch,i}$, the carrier frequency $F_i$ will, when tuned to the corresponding system frequency $F^*_i$, undergo the same amount of attenuation when measured at the center frequency of channel i–1 or at the center frequency of channel i. Of course, it should be understood that different WDD devices can be used and will lead to different embodiments of the invention, depending on the inter-channel spacing, on the shape of each individual channel response and on variations in the response shape among optical channels. For example, it is within the scope of the invention to use a WDD device with individual channel responses each consisting of a wide main lobe and distant or even nonexistent side lobes.

Figure 4:
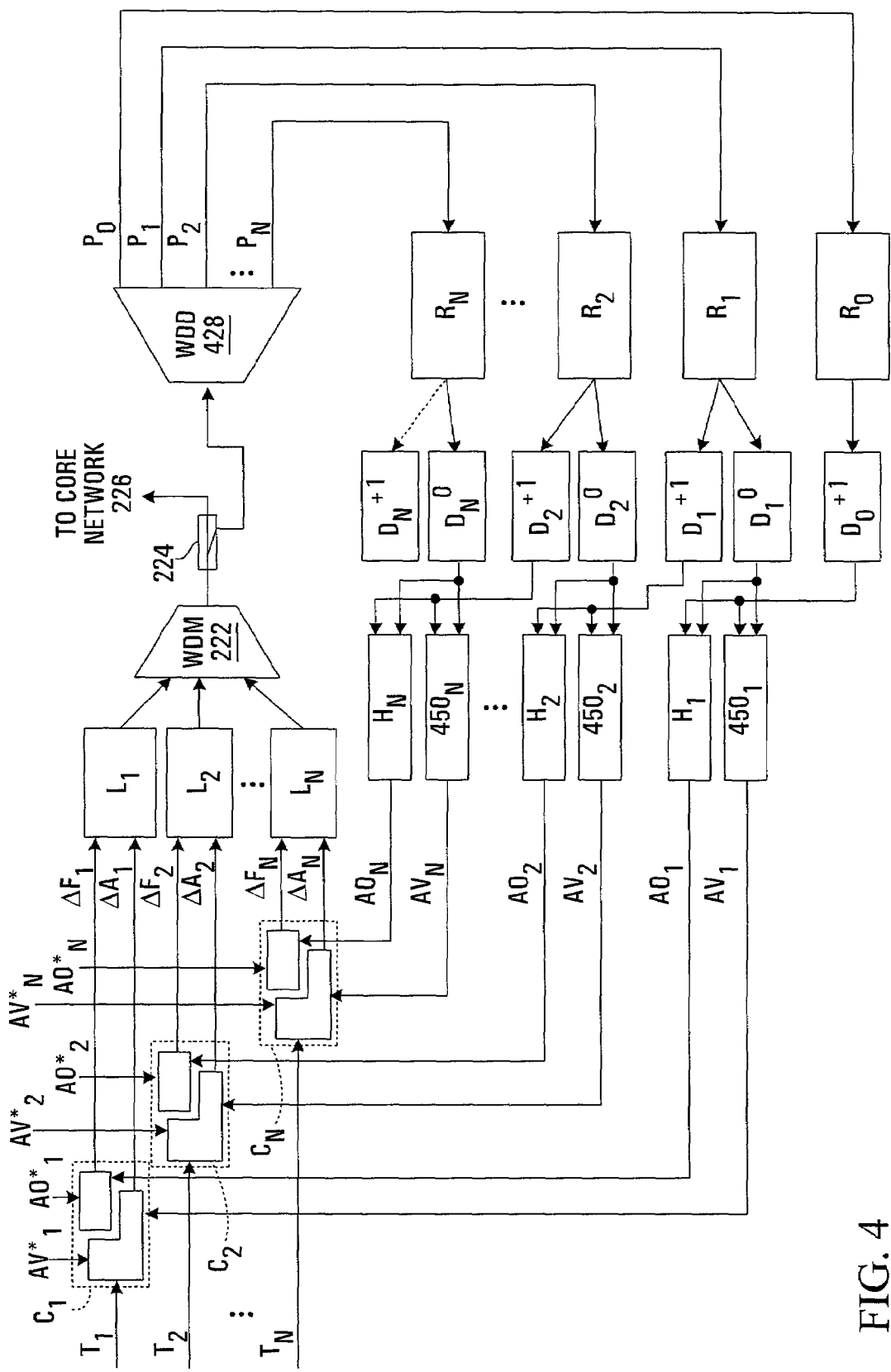
FIG. 4 shows in schematic form a multi-carrier optical signal source in accordance with a second embodiment of the present invention.

Continuing with the description of FIG. 4, each output port $P_i$ ($0 \leq i \leq N$) of the WDD device 428 is connected to a respective low-bandwidth optical receiver $R_i$ ($0 \leq i \leq N$), which is adapted to provide opto-electronic conversion functionality. Each of the optical receivers $R_i$ for which $1 \leq i \leq N$ outputs a low-bandwidth electrical version of the portion of the multi-carrier optical signal centered about the corresponding channel center frequency $F_{ch,i}$ which, in the embodiment of FIG. 4, corresponds to system frequency $F^*_i$ augmented by half of the channel spacing. Thus, each optical receiver $R_i$ outputs a low-bandwidth electrical version of the portion of the multi-carrier optical signal centered about $F^*_i + 50$ GHz. In addition, output port $P_0$ is connected to low-bandwidth optical receiver $R_0$, which provides opto-electronic conversion of the portion of the multi-carrier optical signal centered at $F^*_1 - 50$ GHz.

Each of the middle optical receivers $R_i$ for which $1 \leq i \leq N$ is connected to two tone detectors $D_i^0$ and $D_i^{+1}$. Tone detector $D_i^0$ is adapted to measure the amplitude of tone frequency $T_i$ in the signal processed by receiver $R_i$, while tone detector $D_i^{+1}$ is adapted to measure the amplitude of tone frequency $T_{i+1}$ in the signal processed by receiver $R_i$.

Due to the response characteristics of the WDD device 428, the measured amplitude offset $AO_i$ and the measured carrier amplitude $AV_i$ need to be generated in a slightly different manner, when compared to the way in which these signals were generated in the embodiment of FIG. 2. Firstly, in order to determine whether the signal received by each receiver $R_i$ is truly centered between channel center frequencies $F_{ch,i-1}$ and $F_{ch,i}$, a comparator $H_i$ is provided for each receiver $R_i$. Comparator $H_i$ has one input connected to the output of tone detector $D_{i-1}^{+1}$ (which is connected to receiver $R_{i-1}$) and another input connected to the output of tone detector $D_i^0$ (which is connected to receiver $R_i$). In other words, comparator $H_i$ evaluates the difference between the amplitude of the component at tone frequency $T_i$ of the optical signal in the channel centered about frequency $F_{ch,i}$ and the amplitude of the component at tone frequency $T_i$ of the optical signal in the channel centered about frequency $F_{ch,i-1}$. The output of each comparator $H_i$, $1 \leq i \leq N$, is the aforedescribed measured amplitude offset $AO_i$, which is fed to laser controller $C_i$ associated with optical carrier i.

Also, due to the offset in the channel responses of the WDD device 428, it is noted that the power of a given optical carrier cannot be estimated directly from measuring the amplitude of that optical carrier at the center frequency of one of the optical channels. In order to obtain a reliable measurement of the presence of tone $T_i$, a power combiner 450$_i$ combines the amplitude measured by the two tone detectors associated with tone $T_i$, namely tone detector $D_i^0$ and tone detector $D_{i-1}^{+1}$. The output of power combiner 450$_i$ is a used as the previously described measured carrier amplitude $AV_i$ which is fed to laser controller $C_i$ associated with optical carrier i. Alternatively, as indicated previously, a conventional amplitude stabilization loop based on the use of a back facet monitor diode with each laser can be implemented with no loss effect on the ability of the frequency control loop to lock the carrier frequencies.

Operation of the amplitude and frequency control loops involving controller $C_i$ is now described by way of a non-limiting example. Initially, under open loop conditions, controller $C_i$ sets the amplitude adjustment signal $\Delta A_i$ to a low value such that laser $L_i$ radiates at a relatively low power level. At this low power level, the frequency control loop is used to tune the carrier frequency $F_i$ of laser $L_i$ to the appropriate system frequency $F^*_i$. Specifically, laser controller $C_i$ compares the measured amplitude offset $AO_i$ at the output of comparator $H_i$ to a desired offset $AO^*_i$. The result of this comparison is the frequency adjustment signal $\Delta F_i$, which is fed to suitable frequency correction circuitry in laser $L_i$.

The desired offset $AO^*_i$ depends on the frequency response of the WDD device 428 for each individual optical channel. For example, in the case where each main lobe is symmetric about the corresponding channel center frequency $F_{ch,i}$ and where channel center frequency $F_{ch,i}$ corresponds to system frequency $F^*_i$ plus half the channel spacing (such as is the case with the individual channel responses of FIG. 5), then the desired offset $AO^*_i$ is zero. That is to say, the carrier frequency $F_i$ is equal to the corresponding system frequency $F^*_i$ only when the amplitude of tone frequency $T_i$ is the same in the signal processed by receiver $R_{i-1}$ as it is in the signal processed by receiver $R_i$.

In other cases, the main lobes might not be symmetric about their respective channel center frequencies, but the shape of each response would be known in advance and hence it would be possible to determine the magnitude of the offset $AO^*_i$ which should exist between the amplitude of tone frequency $T_i$ in the signal processed by receiver $R_{i-1}$ and the amplitude of tone frequency $T_i$ in the signal processed by receiver $R_i$.

Once the carrier frequency $F_i$ has been adjusted to match the corresponding system frequency $F^*_i$, the next step is to set the amplitude $A_i$ using the amplitude control loop. To this end, laser controller $C_i$ compares the measured carrier amplitude $AV_i$ to a desired carrier amplitude $AV^*_i$ and the difference is used to create the d.c. component of the amplitude adjustment signal $\Delta A_i$. Specifically, the difference between $AV_i$ and $AV^*_i$ is amplified and becomes the control for the d.c. bias (or d.c. drive current) through laser $L_i$, thus causing it to lase at an optical power related to that drive current. This d.c. bias is combined with a small signal at tone frequency $T_i$ to produce the a.c. component of the amplitude adjustment signal $\Delta A_i$, thereby inducing a small amount of intensity modulation on the optical output of laser $L_i$.

At first, laser controller $C_i$ will detect a low power output and, as a result, the amplitude adjustment signal $\Delta A_i$ will be steadily increased. This action may consequently skew the carrier frequency $F_i$, but because the latter is under control of the frequency feedback loop, any drift in the carrier frequency $F_i$ with respect to the corresponding system frequency $F^*_i$ will be compensated for by a change to the frequency control conditions.

The exact technique for correcting carrier frequency $F_i$ using the frequency adjustment signal $\Delta F_i$ depends on the design of laser $L_i$. Any suitable technique can be used for this purpose, including changing the substrate temperature, changing the bias voltage on (or current through) a third electrode connected to a series cavity, etc. In the case of a thermally tuned laser, the frequency adjustment signal $\Delta F_i$ would be amplified and injected as a reference level into a Peltier cooler control circuit, causing an offset in the stabilized temperature of laser $L_i$. The magnitude of the adjustments would reduce to almost zero as laser $L_i$ tunes its frequency of optical radiation to the required system frequency $F^*_i$.

A third embodiment of the multi-carrier optical signal source of the present invention is now described with reference to FIG. 6. This embodiment uses yet another wavelength division demultiplexing (WDD) device 628 as the frequency discriminator. The WDD device 628 has a channel separation of one half of the intended optical grid output separation (i.e. 50 GHz for a 100 GHz grid) and has an offset of one half of the WDD channel spacing (25 GHz for a 50 GHz WDD).

Each of the lasers $L_i$ outputs a single-carrier optical signal which is fed to a common broad-lobed wavelength division multiplexing (WDM) device 222. The WDM device 222 combines the N single-carrier optical signals into a multi-carrier optical signal. The output of the WDM device 222 is connected, via a splitter 224, both to the core network 226 and to the WDD device 628. The splitter 224 may suitably divert between 5 and 10% of the optical power of the multi-carrier optical signal towards the WDD device 628, while feeding the rest of the power to the core network 226. Of course, those skilled in the art will appreciate that other power splitting ratios are possible.

The WDD device 628 is substantially a multi-channel optical filter. In the embodiment of FIG. 6, the WDD device 628 has 2N output ports $P_{2i+k}$, $1 \leq i \leq N$, $-1 \leq k \leq 0$. Specifically, each port is associated with an optical channel having an optical pass band centered about a unique channel center frequency $F_{ch,2i+k}$. In the specific embodiment of FIG. 6, the channel center frequencies $F_{ch,2i+k}$ correspond to $F^*_i+((-1)^k \cdot 25)$ GHz. In other words, system frequency $F^*_i$ falls mid-way between channel center frequency $F_{ch,2i-1}$ and channel center frequency $F_{ch,2i}$.

Figure 7:
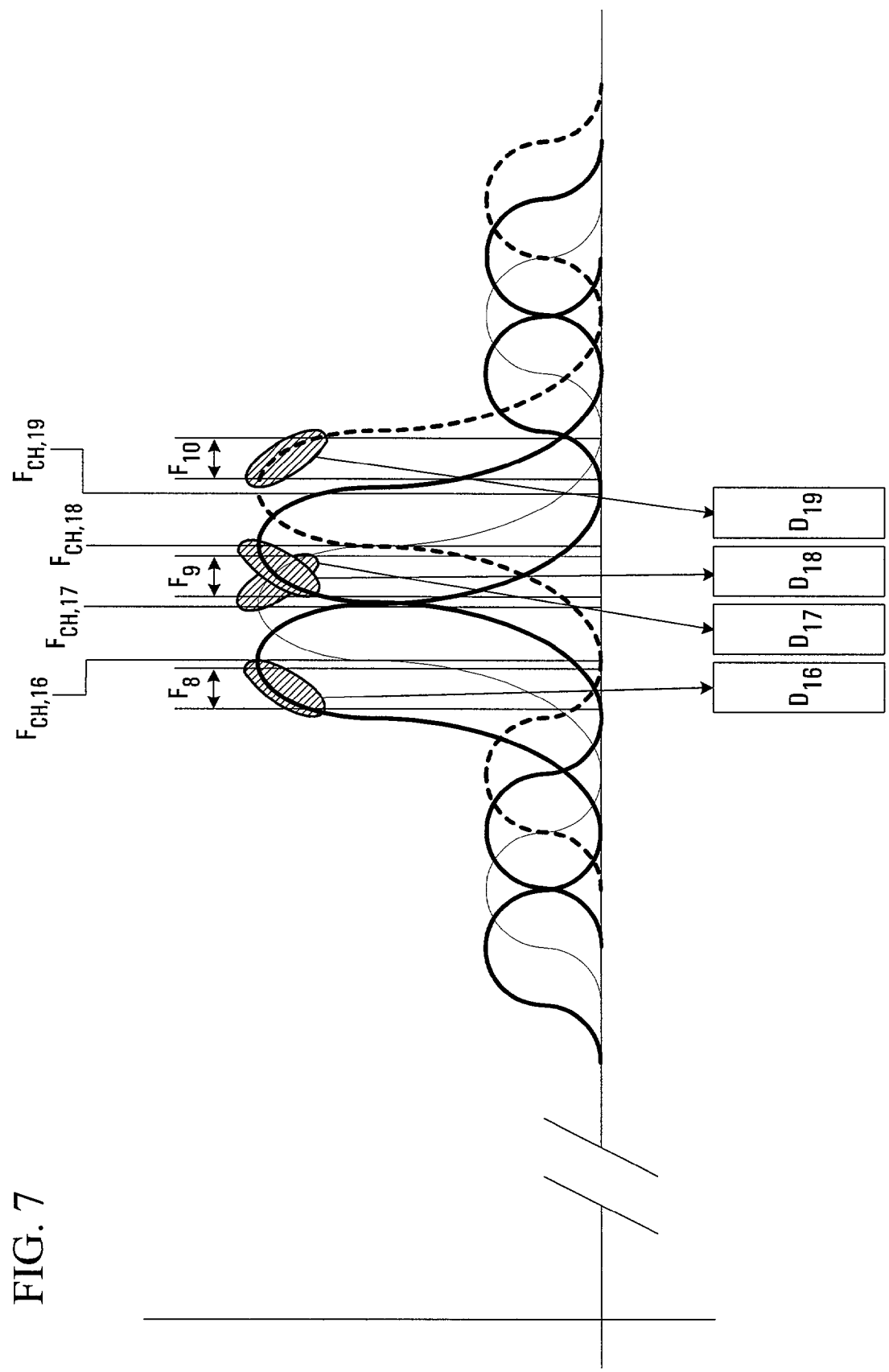
FIG. 7 illustrates example individual channel responses for part of the overall responses of a wavelength division demultiplexing device suitable for use with the multi-carrier optical signal source of FIG. 6 and the positions of various optical carrier spectral lines within their passbands when the multi-carrier optical signal source is stabilized.

This is illustrated in FIG. 7, where channel center frequencies $F_{ch,17}$, $F_{ch,18}$ and $F_{ch,19}$ are shown. It is seen that each system frequency is located half way between two channel center frequencies which are uniquely associated with that system frequency. As can be seen, when the main lobe of a given optical channel is symmetric on either side of its channel center frequency, the optical carrier at frequency $F_i$ will, when tuned to the corresponding system frequency $F^*_i$, undergo the same amount of attenuation when measured at the center frequency of either channel $2i-1$ or channel $2i$. Of course, it should be understood that different WDD devices can be used and will lead to different embodiments of the invention, depending on the inter-channel spacing, on the shape of each individual channel response and on variations in the response shape among optical channels.

Figure 6:
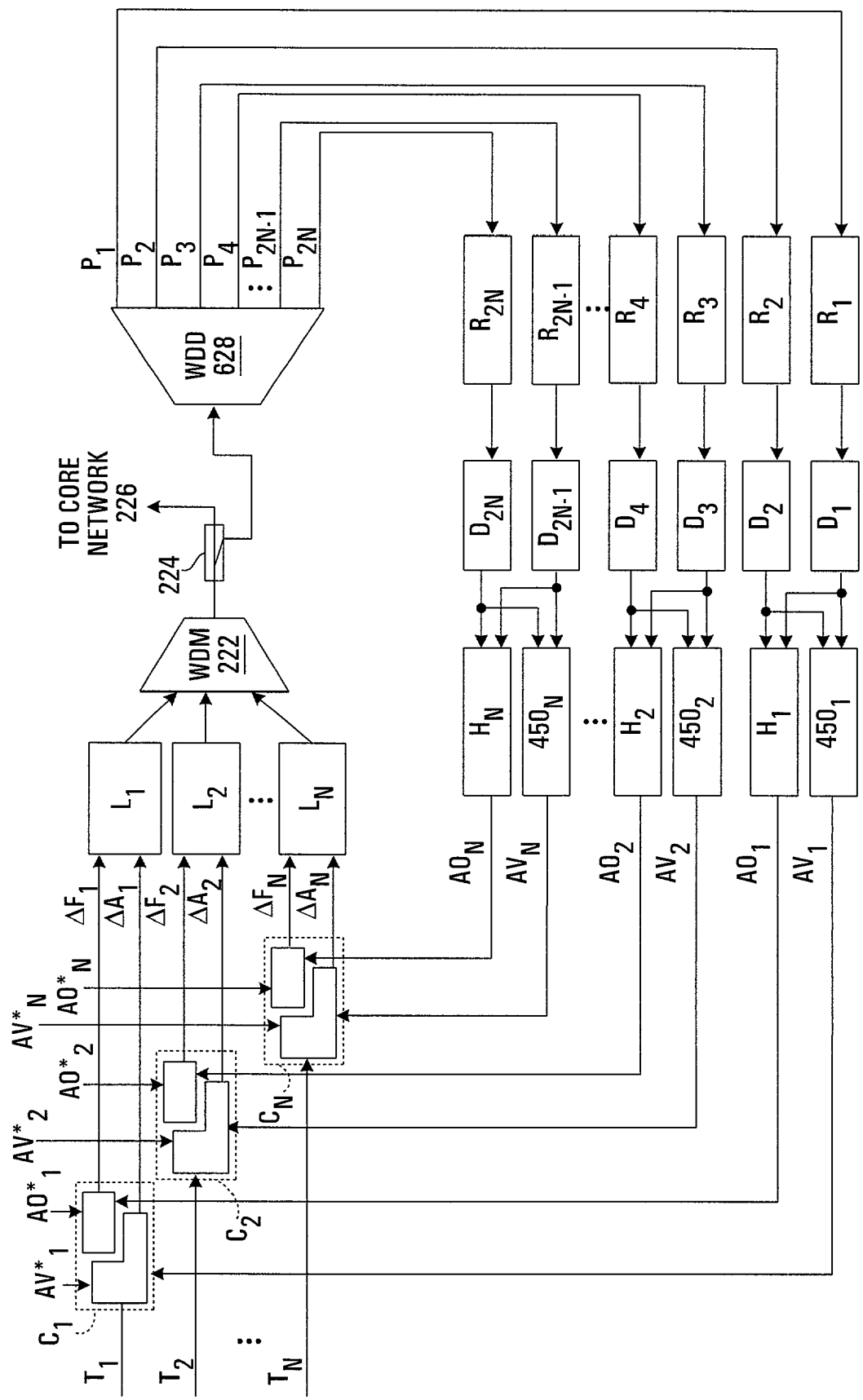
FIG. 6 shows in schematic form a multi-carrier optical signal source in accordance with a third embodiment of the present invention.

Continuing with the description of FIG. 6, each output port $P_{2i+k}$, $1 \leq i \leq N$, $-1 \leq k \leq 0$, of the WDD device 628 is connected to a respective low-bandwidth optical receiver $R_{2i+k}$, $1 \leq i \leq N$, $-1 \leq k \leq 0$, which is adapted to provide opto-electronic conversion functionality. Each of the optical receivers $R_{2i+k}$ outputs a low-bandwidth electrical version of the portion of the multi-carrier optical signal centered about the corresponding channel center frequency $F_{ch,2i+k}$ which, in the embodiment of FIG. 6, corresponds to system frequency $F^*_i$ adjusted by $(-1)^k \cdot 25$ GHz. That is to say, each optical receiver $R_{2i+k}$ outputs a low-bandwidth electrical version of the portion of the multi-carrier optical signal centered about $F^*_i+(-1)^k \cdot 25$ GHz.

Each of the optical receivers $R_{2i+k}$, $1 \leq i \leq N$, $-1 \leq k \leq 0$, is connected to a respective tone detector $D_{2i+k}$, $1 \leq i \leq N$, $-1 \leq k \leq 0$. Tone detectors $D_{2i}$ and $D_{2i+1}$ are both adapted to measure the amplitude of same tone frequency $T_i$ in the signal processed by the respective receiver. In order to determine whether the optical carrier at frequency $F_i$ undergoes the same amount of attenuation when measured at the center frequency of channel $2i-1$ as at the center frequency of channel $2i$, a comparator $H_i$ is provided for each pair of receivers $R_{2i-1}$ and $R_{2i}$. Comparator $H_i$ has one input connected to the output of tone detector $D_{2i-1}$ (which is connected to receiver $R_{2i-1}$) and another input connected to the output of tone detector $D_{2i}$ (which is connected to receiver $R_{2i}$). In other words, comparator $H_i$ evaluates the difference between the amplitude of the component at tone frequency $T_i$ of the optical signal in the channel centered about frequency $F_{ch,2i-1}$ and the amplitude of the component at tone frequency $T_i$ of the optical signal in the channel centered about frequency $F_{ch,2i}$. The output of each comparator $H_i$, $1 \leq i \leq N$, is the previously described measured amplitude offset $AO_i$, which is fed to laser controller $C_i$ associated with optical carrier $i$.

Also, due to the offset in the channel responses of the WDD device 628, it is noted that the power of a given optical carrier cannot be estimated directly from measuring the amplitude of that optical carrier at the center frequency of one of the optical channels. In order to obtain a reliable measurement of the presence of tone $T_i$, a power combiner 450$_i$ combines the amplitude measured by the two tone detectors associated with tone $T_i$, namely tone detector $D_{2i-1}$ and tone detector $D_{2i}$. The output of power combiner 450$_i$ is a used as the previously described measured carrier amplitude $AV_i$ which is fed to laser controller $C_i$ associated with optical carrier $i$.

Operation of the amplitude and frequency control loops involving controller $C_i$ is now described by way of a non-limiting example. Initially, under open loop conditions, controller $C_i$ sets the amplitude adjustment signal $\Delta A_i$ to a low value such that laser $L_i$ radiates at a relatively low power level. At this low power level, the frequency control loop is used to tune the carrier frequency $F_i$ of laser $L_i$ to the appropriate system frequency $F^*_i$. Specifically, laser controller $C_i$ compares the measured amplitude offset $AO_i$ at the output of comparator $H_i$ to a desired offset $AO^*_i$. The result of this comparison is the frequency adjustment signal $\Delta F_i$, which is fed to suitable frequency correction circuitry in laser $L_i$.

The desired offset $AO^*_i$ depends on the frequency response of the WDD device 628 for each individual optical channel. For example, in the case where each main lobe is symmetric about the corresponding channel center frequency and where channel center frequency $F_{ch,2i+k}$ corresponds to $F^*_i+(-1)^k \cdot \frac{1}{4}$ of the channel spacing (such as is the case with the individual channel responses of FIG. 7), then the desired offset $AO^*_i$ is zero. That is to say, the carrier frequency $F_i$ is equal to the corresponding system frequency $F^*_i$ only when the amplitude of tone frequency $T_i$ is the same in the signal processed by receiver $R_{2i-1}$ as it is in the signal processed by receiver $R_{2i}$. In other cases, the main lobes might not be symmetric about their channel center frequencies, but the shape of each response would be known in advance and hence it would be possible to determine the magnitude of the offset $AO^*_i$ which should exist between the amplitude of tone frequency $T_i$ in the signal processed by receiver $R_{2i-1}$ and the amplitude of tone frequency $T_i$ in the signal processed by receiver $R_{2i}$.

Once the carrier frequency $F_i$ has been adjusted to match the corresponding system frequency $F^*_i$, the next step is to set the amplitude $A_i$ using the amplitude control loop. To this end, laser controller $C_i$ compares the measured carrier amplitude $AV_i$ to a desired carrier amplitude $AV^*_i$ and the difference is used to create the d.c. component of the amplitude adjustment signal $\Delta A_i$. Specifically, the difference between $AV_i$ and $AV^*_i$ is amplified and becomes the control for the d.c. bias (or d.c. drive current) through laser $L_i$, thus causing it to lase at an optical power related to that drive current. This d.c. bias is combined with a small signal at tone frequency $T_i$ to produce the a.c. component of the amplitude adjustment signal $\Delta A_i$, thereby inducing a small amount of intensity modulation on the optical output of laser $L_i$.

At first, laser controller $C_i$ will detect a low power output and, as a result, the amplitude adjustment signal $\Delta A_i$ will be steadily increased. This action may consequently skew the carrier frequency $F_i$, but because the latter is under control of the frequency feedback loop, any drift in the carrier frequency $F_i$ with respect to the corresponding system frequency $F^*_i$ will be compensated for by a change to the frequency control conditions.

The exact technique for correcting carrier frequency $F_i$ using the frequency adjustment signal $\Delta F_i$ depends on the design of laser $L_i$. Any suitable technique can be used for this purpose, including changing the substrate temperature, changing the bias voltage on (or current through) a third electrode connected to a series cavity, etc. In the case of a thermally tuned laser, the frequency adjustment signal $\Delta F_i$ would be amplified and injected as a reference level into a Peltier cooler control circuit, causing an offset in the stabilized temperature of laser $L_i$. The magnitude of the adjustments would reduce to almost zero as laser $L_i$ tunes its frequency of optical radiation to the required system frequency $F^*_i$.

Whilst the above operation has been described in the context of accurately modulated low-modulation tones and tone receivers, it is to be understood that, if the free-running precision of the lasers $L_i$ and the pass-band characteristics of the WDD device 628 are such that only insignificant optical powers can turn up in the wrong lobe, then the tones can be eliminated and the tone detectors $D_i$ can be replaced by simple d.c. optical power monitors, since there is no longer any need to be able to discriminate the presence of more than one optical carrier in a particular optical channel output by the WDD device via ports $P_i$.

A fourth embodiment of the multi-carrier optical signal source of the present invention is now described with reference to FIG. 8. In this embodiment, which is a variation of the embodiment of FIG. 6, tones are used to tune the carrier frequencies $F_i$ to the system frequencies $F^*_i$, but the tones are subsequently removed in order not to disturb the traffic on each optical carrier. The tones may thereafter be reinstated under certain conditions to be described herein below.

Figure 8:
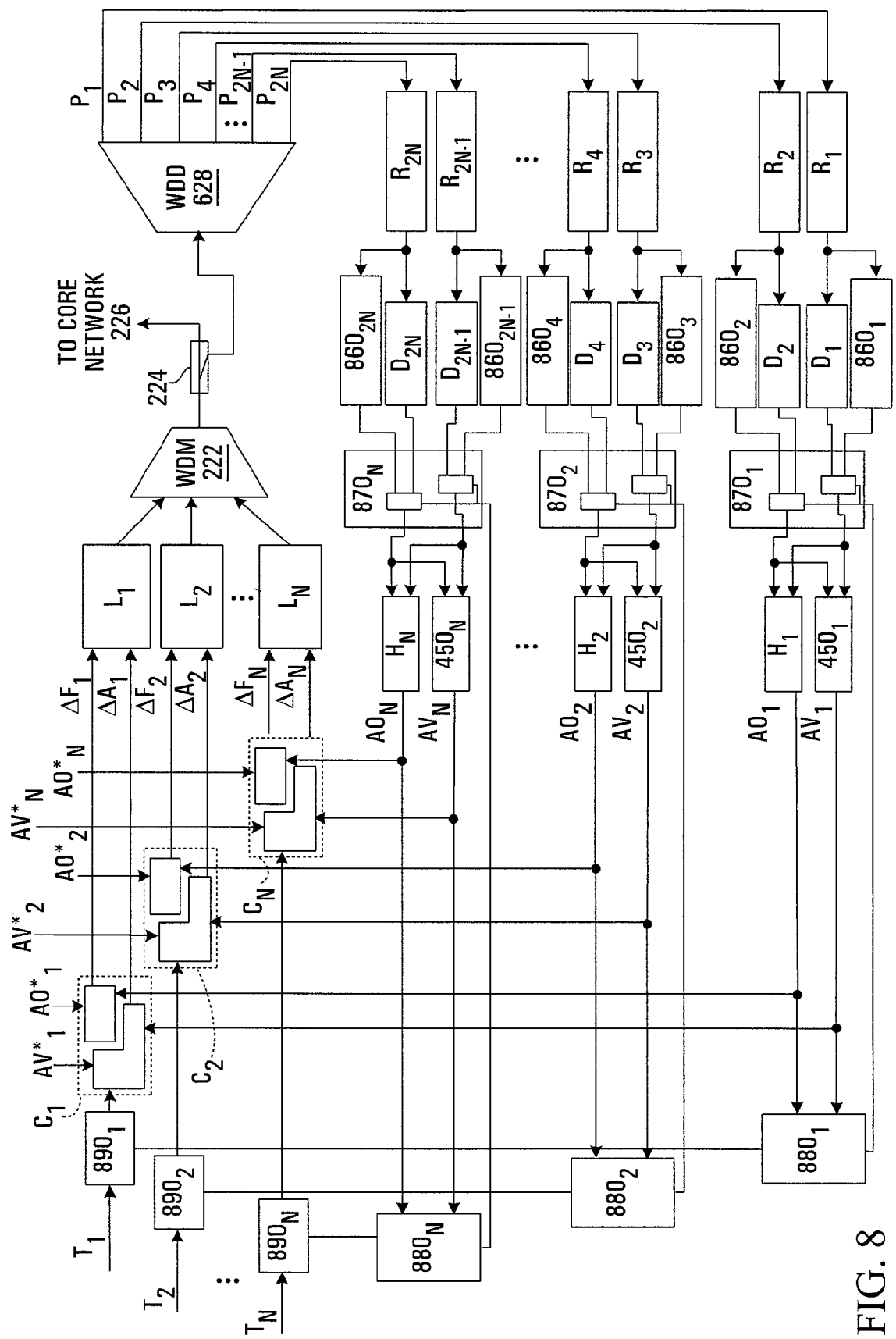
FIG. 8 shows in schematic form a multi-carrier optical signal source in accordance with a fourth embodiment of the present invention.

With reference to FIG. 8, each output port $P_{2i+k}$, $1 \leq i \leq N$, $-1 \leq k \leq 0$, of the WDD device 628 is connected to a respective low-bandwidth optical receiver $R_{2i+k}$, $1 \leq i \leq N$, $-1 \leq k \leq 0$, which is adapted to provide opto-electronic conversion functionality. Each of the optical receivers $R_{2i+k}$ outputs a low-bandwidth electrical version of the portion of the multi-carrier optical signal centered about the corresponding channel center frequency $F_{ch,2i+k}$ which, in the embodiment of FIG. 6, corresponds to system frequency $F^*_i$ adjusted by $(-1)^k \cdot 25$ GHz. That is to say, each optical receiver $R_{2i+k}$ admits a low-bandwidth electrical version of the portion of the multi-carrier optical signal centered about $F^*_i + (-1)^k \cdot 25$ GHz.

Each of the optical receivers $R_{2i+k}$, $1 \leq i \leq N$, $-1 \leq k \leq 0$, is connected to a respective power monitor $860_{2i+k}$, $1 \leq i \leq N$, $-1 < k \leq 0$ and to a respective tone detector $D_{2i+k}$, $1 \leq i \leq N$, $-1 \leq k \leq 0$. Power monitor $860_{2i+k}$ is adapted to measure the power in the signal admitted by the respective receiver. Tone detectors $D_{2i-1}$ and $D_{2i}$ are adapted to measure the amplitude of the same tone frequency $T_i$ in the signals processed by the respective receivers.

The outputs of power monitors $860_{2i-1}$, $860_{2i}$ and the outputs of tone detectors $D_{2i-1}$, $D_{2i}$ are connected to four inputs of a controllable switch $870_i$. Switch $870_i$ has two outputs, each of which is connected to separate inputs of a comparator $H_i$ and a power combiner $450_i$. Switch $870_i$ functions in two states; in the first state, switch $870_i$ connects the output of tone detector $D_{2i-1}$ to a first input of comparator $H_i$ and to a first input of power combiner $450_i$, and switches the output of tone detector $D_{2i}$ to a second input of comparator $H_i$ and to a second input of power combiner $450_i$. In the second state, switch $870_i$ connects the output of power monitor $860_{2i-1}$ to the first input of comparator $H_i$ and to the first input of power combiner $450_i$, and switches the output of power monitor $860_{2i}$ to the second input of comparator $H_i$ and to the second input of power combiner $450_i$.

Thus, when switch $870_i$ operates in the first state, comparator $H_i$ evaluates the difference between the amplitude of the component at tone frequency $T_i$ of the optical signal in the channel centered about frequency $F_{ch,2i-1}$ and the amplitude of the component at tone frequency $T_i$ of the optical signal in the channel centered about frequency $F_{ch,2i}$. On the other hand, when switch $870_i$ operates in the second state, comparator $H_i$ evaluates the difference between the power of the optical signal in the channel centered about frequency $F_{ch,2i-1}$ and the power of the optical signal in the channel centered about frequency $F_{ch,2i}$. In each case, the output of each comparator $H_i$, $1 \leq i \leq N$, is the previously described measured amplitude offset $AO_i$, which is fed to laser controller $C_i$ associated with optical carrier i. Additionally, the output of each comparator $H_i$ is fed to a first input of a respective out-of-range detector $880_i$.

Also, when switch $870_i$ operates in the first state, power combiner $450_i$ combines the amplitude measured by the two tone detectors associated with tone $T_i$, namely tone detector $D_{2i-1}$ and tone detector $D_{2i}$. On the other hand, when switch $870_i$ operates in the second state, power combiner $450_i$ combines the amplitude measured by power monitor $860_{2i-1}$ and power monitor $860_{2i}$. In each case, the output of power combiner $450_i$ is a used as the previously described measured carrier amplitude $AV_i$ which is fed to laser controller $C_i$ associated with optical carrier i. Additionally, the output of each power combiner $450_i$ is fed to a second input of the respective out-of-range detector $880_i$.

Out-of-range detector $880_i$, which is connected to comparator $H_i$ and to power combiner $450_i$, is further connected to a control port of switch $870_i$. Out-of-range detector $880_i$ functions to monitor the readings from comparator $H_i$ and power combiner $450_i$ and to control the state of switch $870_i$ as a function of these readings. Initially, switch $870_i$ is set to the first state. If the readings are stable, then out-of-range detector $880_i$ toggles the state of switch $870_i$ so that it enters the second state. If the readings eventually become unstable again, then out-of-range detector $880_i$ is operable to toggle the state of switch $870_i$ back to the first state and to wait for a stable condition to arise again.

It is noted that when switch $870_i$ is in the second state, control of system parameters related to optical carrier i is no longer performed as a function of the presence or absence of tone $T_i$ in the optical channels centered about frequencies $F_{ch,2i-1}$ and $F_{ch,2i}$. Hence, when switch $870_i$ is in the second state, it is no longer necessary to modulate the output of laser $L_i$ with tone $T_i$. To this end, out-of-range detector $880_i$ is provided with a connection to a respective switch $890_i$ that is adapted to disable application of tone $T_i$ to the amplitude control circuit of laser $L_i$. This has the added benefit of keeping the output of laser $L_i$ free of control signals once stability has been achieved. Switch $890_i$ may be integral with laser controller $C_i$. Alternatively, the tones may continue to be applied by the lasers Li, in which case it is advantageous to use a low modulation depth for the tones in order to limit the optical impairment in the transmission system.

Operation of the amplitude and frequency control loops involving controller $C_i$ is now described by way of a non-limiting example. Initially, under open loop conditions, out-of-range detector $880_i$ sets the switch $870_i$ to the first state (in which tone detection is used for control purposes) and controller $C_i$ sets the amplitude adjustment signal $\Delta A_i$ to a low value such that laser $L_i$ radiates at a relatively low power level. At this low power level, the frequency control loop is used to tune the carrier frequency $F_i$ of laser $L_i$ to the appropriate system frequency $F^*_i$. Specifically, laser controller $C_i$ compares the measured amplitude offset $AO_i$ at the output of comparator $H_i$ to a desired offset $AO^*_i$. The result of this comparison is the frequency adjustment signal $\Delta F_i$, which is fed to suitable frequency correction circuitry in laser $L_i$.

The desired offset $AO^*_i$ depends on the frequency response of the WDD device 628 for each individual optical channel. For example, in the case where each main lobe is symmetric about the corresponding channel center frequency and where channel center frequency $F_{ch,2i+k}$ corresponds to $F^*_i + (-1)^k \cdot 1/4$ of the channel spacing (such as is the case with the individual channel responses of FIG. 7), then the desired offset $AO^*_i$ is zero. That is to say, the carrier frequency $F_i$ is equal to the corresponding system frequency $F^*_i$ only when the amplitude of tone frequency $T_i$ is the same in the signal processed by receiver $R_{2i-1}$ as it is in the signal processed by receiver $R_{2i}$. In other cases, the main lobes might not be symmetric about their channel center frequencies, but the shape of each response would be known in advance and hence it would be possible to determine the magnitude of the offset $AO^*_i$ which should exist between the amplitude of tone frequency $T_i$ in the signal processed by receiver $R_{2i-1}$ and the amplitude of tone frequency $T_i$ in the signal processed by receiver $R_{2i}$.

Once the carrier frequency $F_i$ has been adjusted to match the corresponding system frequency $F^*_i$, the next step is to set the amplitude $A_i$ using the amplitude control loop. To this end, laser controller $C_i$ compares the measured carrier amplitude $AV_i$ to a desired carrier amplitude $A^*_i$ and the difference is used to create the d.c. component of the amplitude adjustment signal $\Delta A_i$. Specifically, the difference between $AV_i$ and $AV^*_i$ is amplified and becomes the control for the d.c. bias (or d.c. drive current) through laser $L_i$, thus causing it to lase at an optical power related to that drive current. This d.c. bias is combined with a small signal at tone frequency $T_i$ to produce the a.c. component of the amplitude adjustment signal $\Delta A_i$, thereby inducing a small amount of intensity modulation on the optical output of laser $L_i$.

At first, laser controller $C_i$ will detect a low power output and, as a result, the amplitude adjustment signal $\Delta A_i$ will be steadily increased. This action may consequently skew the carrier frequency $F_i$, but because the latter is under control of the frequency feedback loop, any drift in the carrier frequency $F_i$ with respect to the corresponding system frequency $F^*_i$ will be compensated for by a change to the frequency control conditions.

The exact technique for correcting carrier frequency $F_i$ using the frequency adjustment signal $\Delta F_i$ depends on the design of laser $L_i$. Any suitable technique can be used for this purpose, including changing the substrate temperature, changing the bias voltage on (or current through) a third electrode connected to a series cavity, etc. In the case of a thermally tuned laser, the frequency adjustment signal $\Delta F_i$ would be amplified and injected as a reference level into a Peltier cooler control circuit, causing an offset in the stabilized temperature of laser $L_i$. The magnitude of the adjustments would reduce to almost zero as laser $L_i$ tunes its frequency of optical radiation to the required system frequency $F^*_i$.

Once an optical carrier has been "locked" in this way by the amplitude and frequency control loops, each comparator $H_i$ will yield a result that is close to the respective desired offset $AO^*_i$ and each power combiner $450_i$ will be giving a high reading. Under these conditions, out-of-range detector $880_i$ will toggle the state of switch $870_i$ so that what is fed to comparator $H_i$ and power combiner $450_i$ is the output of power monitors $860_{2i-1}$ and $860_{2i}$ rather than the output of tone detectors $D_{2i-1}$ and $D_{2i}$. Once this switching has been completed the tone input to laser $L_i$ can be turned off, since it no longer serves any purpose, and hence the locked optical carrier is now tone-free.

It is noted that since a locked optical carrier may be disturbed by a spurious optical signal from a neighbouring but unlocked optical carrier, the individual out-of-range detectors $880_i$ may be cross-coupled so that, even once the optical carrier is locked, the state of switch $870_i$ is not toggled to the second state and tone $T_i$ is not turned off unless these neighbouring optical carriers are also locked. In the event that an optical carrier becomes unlocked, then tone $T_i$ is re-inserted and switch $870_i$ is commanded to return to the first state, in which the outputs of tone detectors $D_{2i-1}$ and $D_{2i}$ are connected to comparator $H_i$ and to power combiner $450_i$. In this sense, "neighbouring" is meant to encompass the maximum amount of optical channels over which may range the divergence of the frequency of a given optical carrier.

Figure 10:
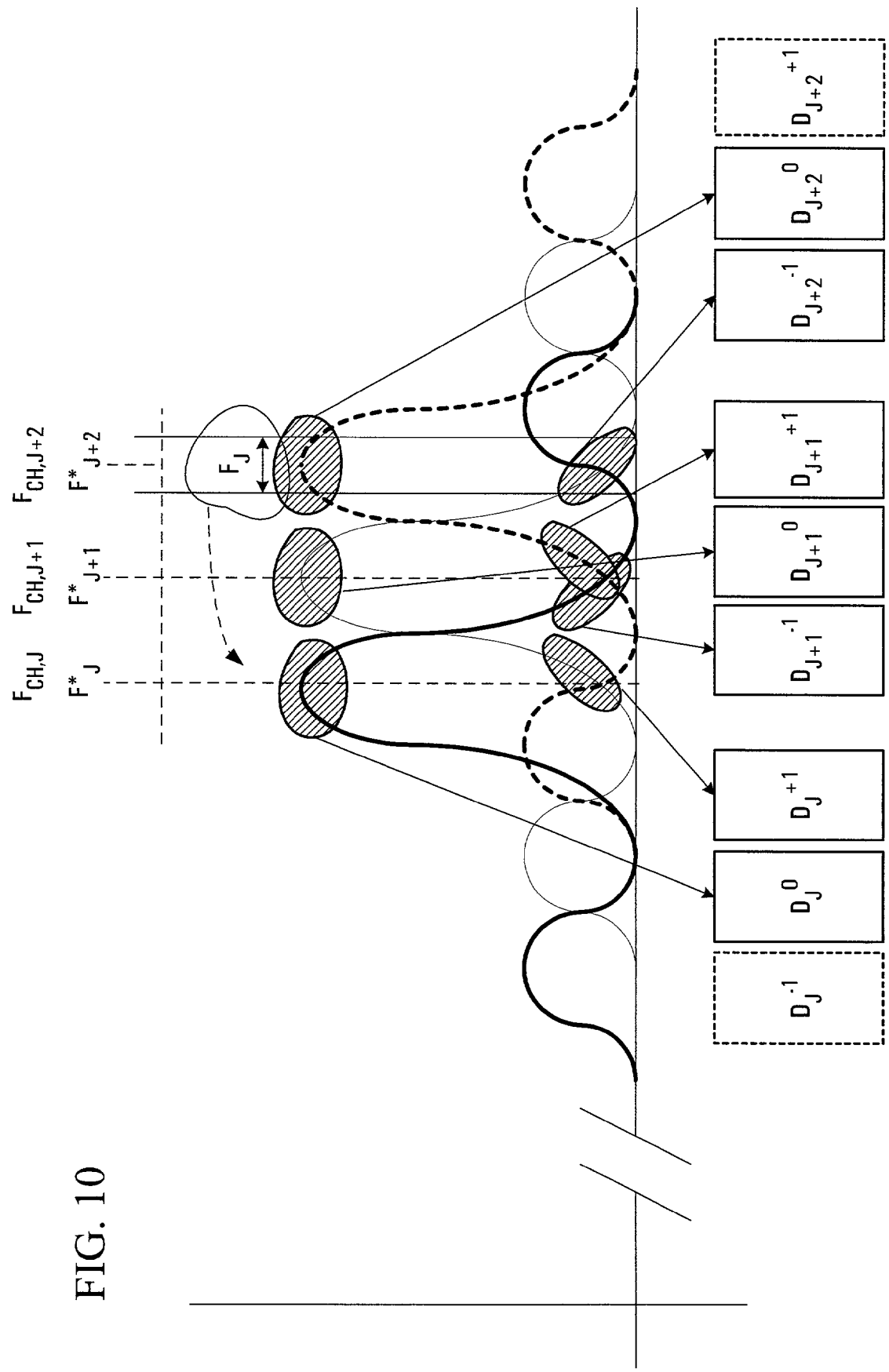
FIG. 10 illustrates example individual channel responses for part of the overall response of a wavelength division demultiplexing device suitable for use with the multi-carrier optical signal source of FIG. 9.

The above embodiments have assumed that the carrier frequencies $F_i$ emitted by the lasers $L_i$ are in the neighbourhood of the corresponding system frequencies $F^*_i$. Although this may be a plausible assumption in many cases, there are situations in which the assumption is not valid. Such situations require an ability to pull in optical sources that are out of sequence or are exhibiting optical frequency offsets in excess of one frequency channel. For example, FIG. 10 shows the case where carrier frequency $F_J$, which was previously assumed to appear in the neighbourhood of system optical frequency $F^*_J$, instead appears in the vicinity of system optical frequency $F^*_{J+2}$. What is required is a coarse wavelength capture mechanism to bring $F_J$ to within the neighbourhood of system optical frequency $F^*_J$, following which the system of FIG. 2 could be reverted to.

Figure 9:
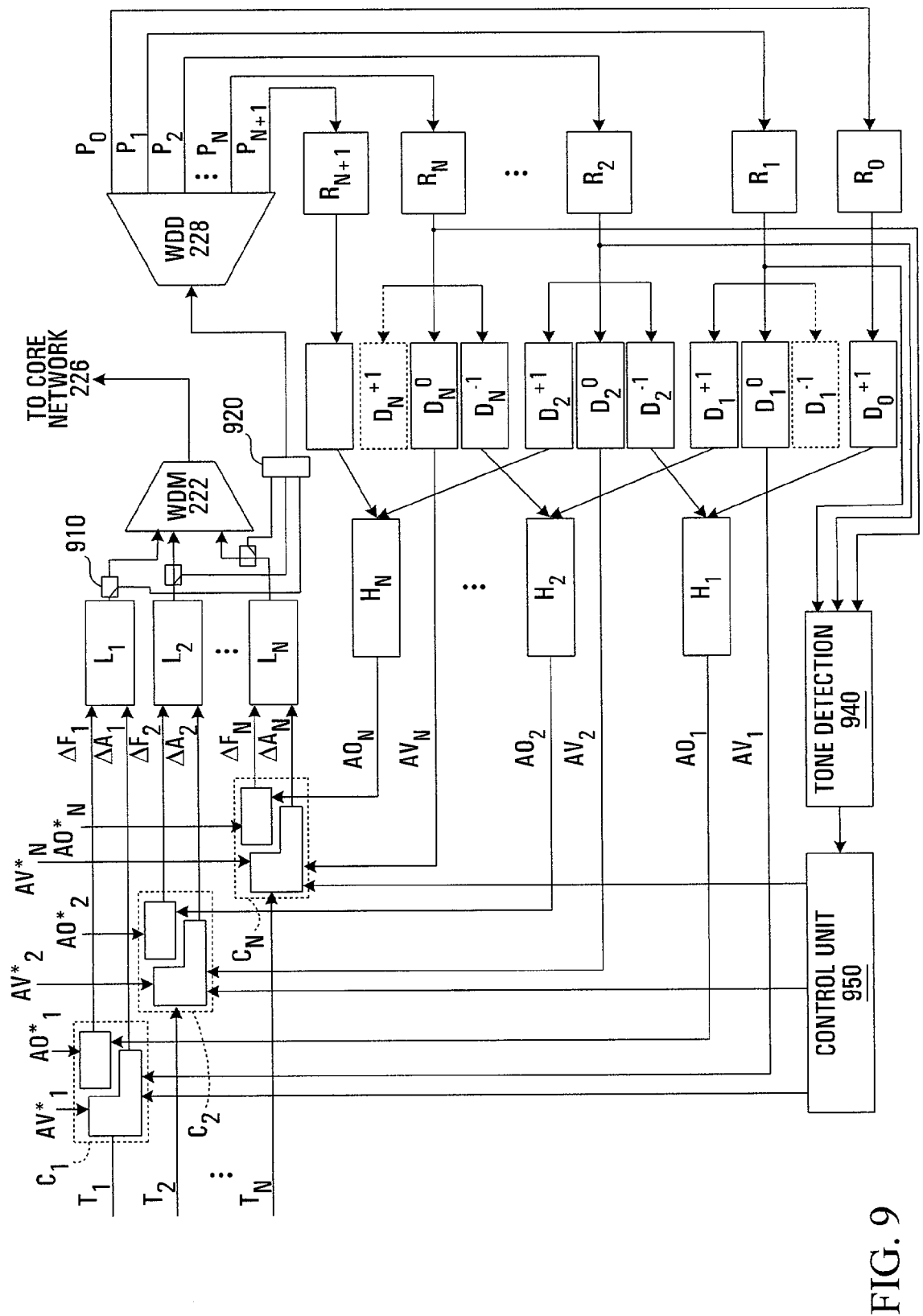
FIG. 9 shows in schematic form a multi-carrier optical signal source in accordance with a fifth embodiment of the present invention.

Accordingly, with reference to FIG. 9, there is shown a fifth embodiment of the present invention, which is similar to the embodiment of FIG. 2 but includes a coarse wavelength capture mechanism, comprising a set of first splitters 910, a combiner 920, a tone detection unit 940 and a control unit 950. It will be noted that the splitter 224 of FIG. 2 has been replaced in FIG. 9 by the set of first splitters 910, each of which is connected between a respective one of the lasers $L_i$ and the WDM device 222. Each splitter 910 may suitably divert between 5 and 10% of the optical power of the respective single-carrier optical signal towards a respective input of the combiner 920, while feeding the rest of the power to the WDM device 222 and the core network. Of course, those skilled in the art will appreciate that other power splitting ratios are possible.

The combiner 920 multiplexes the individual optical signals into a multi-carrier optical signal provided to the input of the WDD device 228, which is substantially a multi-channel optical filter. As already described with reference to FIG. 2, the WDD device 228 has N+2 output ports $P_i$, $0 \leq i \leq N+1$, one for each of N+2 optical channels of width 100 GHz, although it should be understood that the coarse wavelength capture mechanism variation being described here can be applied to any of the previously described example embodiments. Each port is associated with an optical channel having an optical pass band centered about a unique channel center frequency $F_{ch,i}$. In the specific embodiment of FIG. 2, the channel center frequencies $F_{ch,i}$ (which are associated with the N middle ports $P_i$, $1 \leq i \leq N$) correspond to system frequencies $F^*_i$. The two other ports of the WDD device 228, namely $P_0$ and $P_{N+1}$, are associated with optical channels centered about frequencies $F^*_1-100$ GHz and $F^*_N+100$ GHz, respectively.

Each output port $P_i$ ($0 \leq i \leq N+1$) of the WDD device 228 is connected to a respective low-bandwidth optical receiver, denoted $R_i$ for $0 \leq i \leq N+1$, which is adapted to provide opto-electronic conversion functionality. Each of the "middle" optical receivers (i.e., those receivers $R_i$ for which $1 \leq i \leq N$) outputs a low-bandwidth electrical version of the portion of the multi-carrier optical signal centered about the corresponding channel center frequency $F_{ch,i}$ which, in the embodiment of FIG. 9, corresponds to system frequency $F^*_i$. Receivers $R_0$ and $R_{N+1}$ output a low-bandwidth version of the portion of the multi-carrier optical signal centered about $F^*_1-100$ GHz and $F^*_N+100$ GHz, respectively.

As with the embodiment of FIG. 2, each of the optical receivers $R_i$ ($1 \leq i \leq N$) is connected to three tone detectors $D_i^{-1}$, $D_i^0$ and $D_i^{+1}$. Additionally, in the embodiment of FIG. 9, the electrical output of each of the middle optical receivers $R_i$ ($1 \leq i \leq N$) is also buffered and diverted to the tone detection unit 940 at a respective electrical connection point. The tone detection unit 940 may include a set of tunable filters along with a bank of tone detectors. The purpose of the tone detection unit 940 is to determine, through detection of the tones $T_i$, the port $P_{f(i)}$ in which each carrier frequency $F_i$ appears strongest. This information is fed to the control unit 950.

It is noted each laser $L_i$ has to be given a broadband connection into the WDD device 228, since its carrier frequency $F_i$ must be detectable if ever it appears at the "wrong" output port of the WDD device 228 (i.e., if $P_{f(i)}$ is different from $P_i$). It would not be possible to achieve a broadband connection if the splitter 224 of FIG. 2 were used as positioned therein, since if laser $L_i$ were sufficiently off-tune that $F_i$ were to appear at the wrong port, it would have been blocked by the WDM device 222 and it would not be possible for the tone detection unit 940 to detect this fact. The use of a broadband passive combiner 920, on the other hand, allows erroneously positioned carrier frequencies to appear at "wrong" output ports of the WDD device 228. In addition, various optical carrier output multiplexing arrangements can be accommodated, including the example shown in FIG. 2B.

The control unit 950 is adapted to determine, based on information received from the tone detection unit 940, the difference between $P_{f(i)}$ and $P_i$. The control unit 950 is operable to generate a compensatory bias signal which is fed to the corresponding laser controller $C_i$. Laser controller $C_i$ is adapted to add the signal received from the control unit 950 to the previous value of the d.c. bias signal it was sending to laser $L_i$. This is an attempt to cause the carrier frequency $F_i$ to appear at port $P_i$ (but this attempt may be unsuccessful as the carrier frequency $F_i$ may instead appear at port $P_{f(i)}$, which is closer to, but not coincident with, port $P_i$. In this case, the process repeats in an iterative fashion, until the error is reduced such that the initially out-of-place optical carrier appears within the correct lobe.)

In operation, and with reference to the example scenario in FIG. 10, the coarse wavelength capture mechanism provides approximate wavelength tuning by allowing laser $L_J$ to be synchronized from an initial starting position that may be several (in this case +2) lobes off-tune. The fact that carrier frequency $F_J$ appears at port $P_{f(J)}=P_{J+2}$ is detected by the tone detection unit 940 and an appropriate compensatory signal will be generated by the control unit 950. During this time, it is within the scope of the invention to disable adjustments that may be based on any difference between $AO_J$ and $AO^*_J$.

If, as a result of applying the compensatory signal to laser $L_J$ via controller $C_J$, carrier frequency $F_J$ now appears at port $P_J$, then the frequency control loop of FIG. 2 can take over and lock $F_J$ into position with respect to the corresponding system frequency $F^*_J$. However, if the compensatory signal has been insufficient or excessive and laser $L_J$ emits a carrier frequency $F_J$ which—although nearer the correct position—nonetheless still appears strongest at a port $P^1_{f(J)}$ that is not equal to $P_J$, then the coarse wavelength capture mechanism will again detect this fact and will cause the generation of another compensatory signal in an iterative process.

Figure 11:
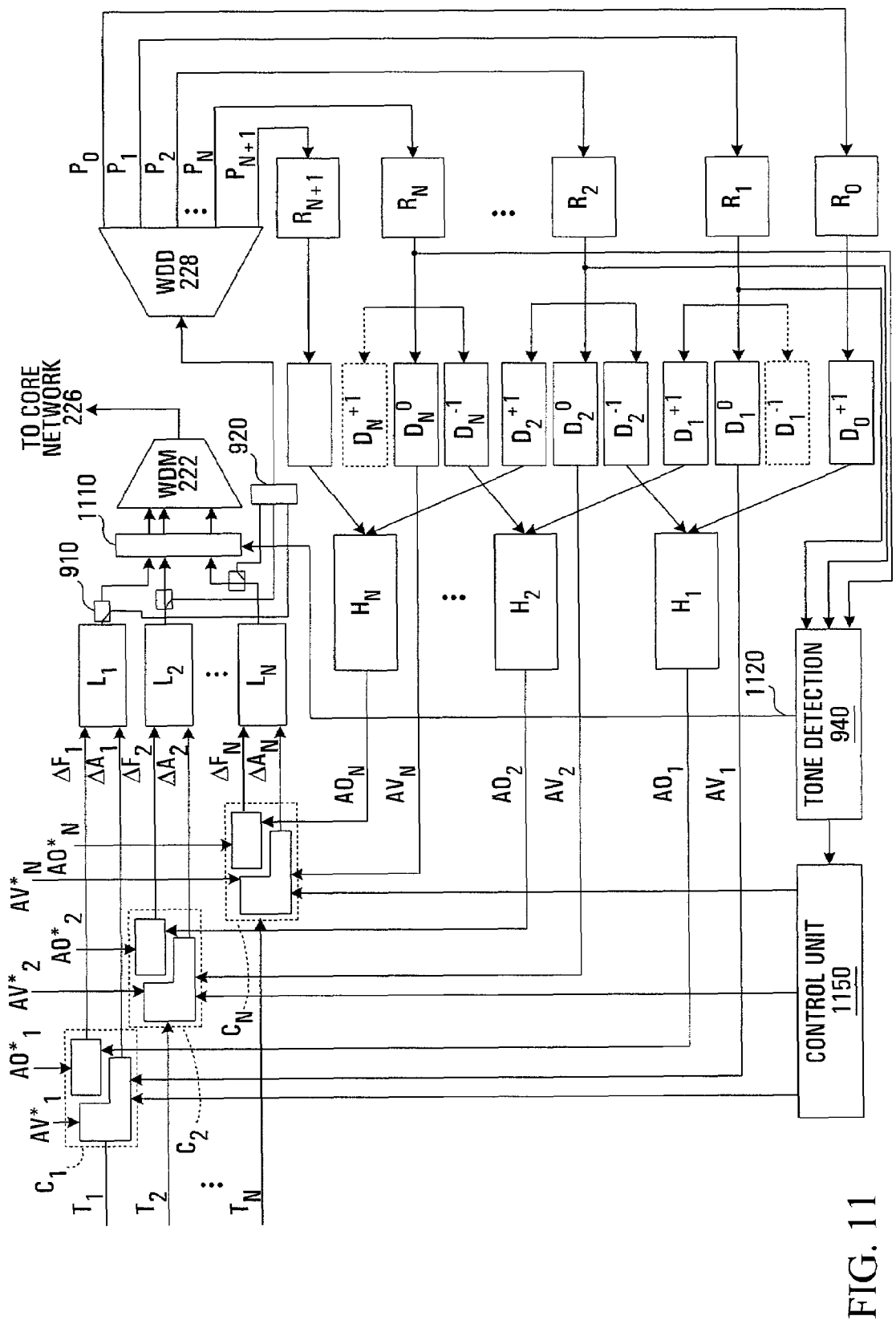
FIG. 11 shows in schematic form a multi-carrier optical signal source in accordance with a sixth embodiment of the present invention.

FIG. 11 shows a sixth embodiment of the present invention, comprising an output switch 1110 that intercepts the optical path leading from each laser $L_i$ to the WDM device 222 or any other optical carrier multiplexing structure which may be required, including straightforward unmultiplexed outputs. Alternatively, there may be provided a set of individual optical switches, each in the optical path of a respective one of the lasers $L_i$. It is noted that the output switch 1110 is located after the splitters 910 to allow the optical signal from each of the lasers $L_i$ to circulate through the frequency control loop, but is located before the WDM device 222 to prevent the optical signal from selected ones of the lasers $L_i$ to exit the multi-carrier optical signal source, under control of a control signal received from a control unit 1150 via a control line 1120.

The control unit 1150 may be based on the control unit 950 of FIG. 9, but is additionally adapted to prevent an optical carrier that is not locked (i.e., an optical carrier for which $AO_i$ is not to within a predetermined threshold of $AO^*_i$) from exiting the multi-carrier optical signal source 100. This advantageously prevents unlocked optical carriers from interfering with locked optical carriers. Specifically, an optical carrier which is close to lock, but is not yet locked, would pass through the WDM device 228 unhindered but may be sufficiently off-tune that, when it is modulated, the modulation side-bands overlap those of an adjacent locked optical carrier. This situation is averted by disconnecting such "almost-locked" optical carriers from the output until they are locked and by disconnecting them from the output if they become unlocked again.

Those skilled in the art will appreciate that although the sixth embodiment illustrated in FIG. 11 is based on the fifth embodiment shown in FIG. 9, it is within the scope of the invention to supply an output switch 1110 with any of the previous embodiments, with or without a coarse wavelength capture mechanism.

Figure 12:
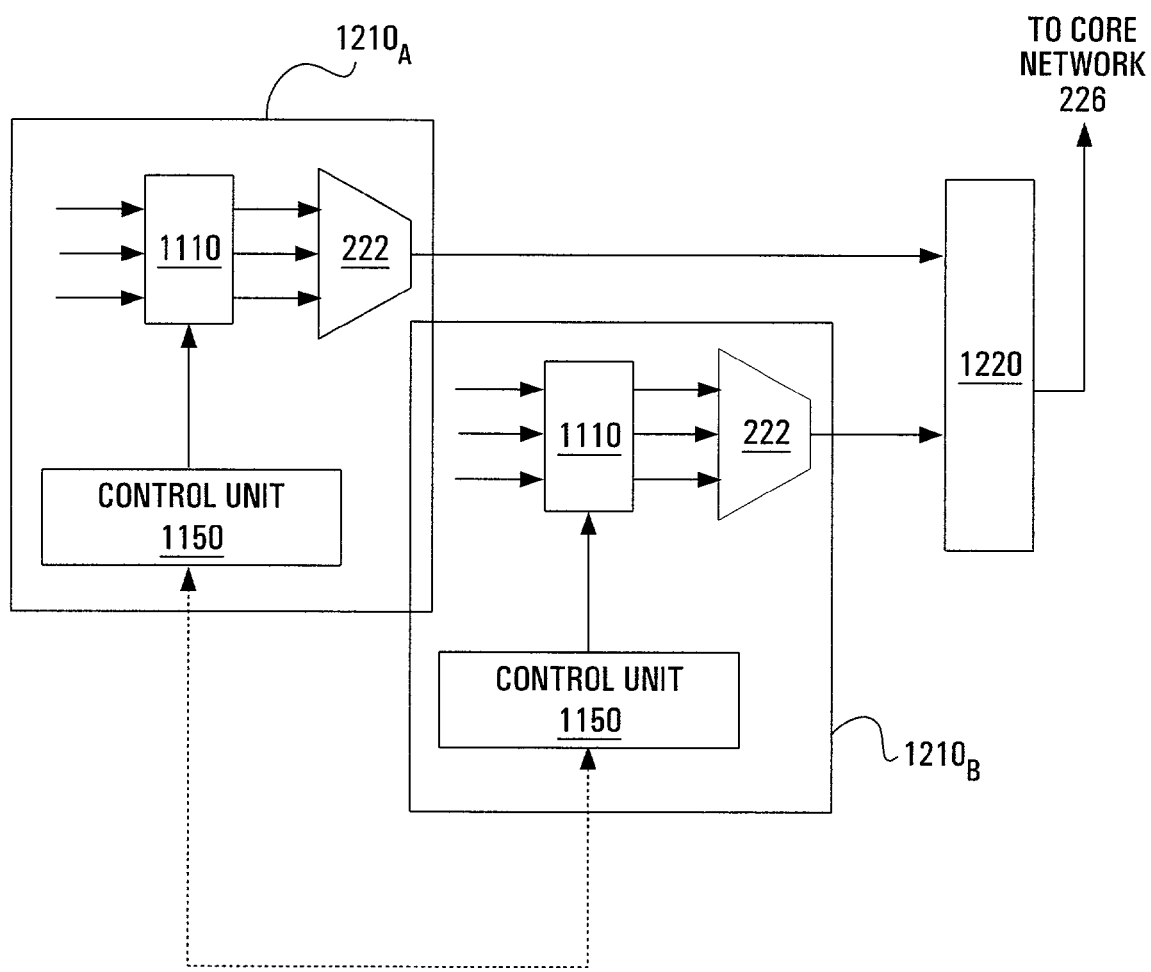
FIG. 12 shows in schematic form a multi-carrier optical signal source in accordance with a seventh embodiment of the present invention.

FIG. 12 shows a seventh embodiment of the present invention, in which the multi-carrier outputs of two (or more) multi-carrier optical signal sources $1210_A$, $1210_B$ of the type described previously with reference to FIG. 11 are combined at a combiner 1220 in order to provide a load-shared or protected system. Each source maintains a map of its own locked optical carriers and the two output switches $1110_A$, $1110_B$ are driven with complimentary connection maps, arrived at by negotiation between the two sources $1210_A$, $1210_B$.

A first non-limiting example of a suitable negotiation algorithm is one in which both units prepare an inventory of working, locked optical carriers. The source which is used to output each successive optical carrier is then chosen alternately between source $1210_A$ and unit $1210_B$ until a optical carrier is reached which is not locked by the chosen source. In that case, the optical carrier is chosen from the other source and the process is continued alternately. In a second non-limiting example of a suitable negotiation algorithm, source $1210_A$ could be designated the master unit and source $1210_B$ the protection unit, with changeover occurring only on those wavelengths which are not locked by source $1210_A$.

It is noted that in the above embodiments, the WDM device 222 and the WDD devices 228, 428, 628 may themselves exhibit a temperature-dependent drift on the order of 1.3 GHz per degree Celsius (° C.). Accordingly, it is within the scope of the present invention to maintain these devices at a constant temperature by a thermostatically controlled heater, which can readily control the temperature of the sub-mount of each device to within 0.3–1° C.

This thermal sensitivity of the WDD devices 228, 428, 628 can also be used to advantage, by locking the output of the multi-carrier optical signal source to a reference wavelength. Specifically, whereas in previous cases, the system frequencies $F^*_i$ were part of a pre-determined grid (such as the ITU grid), it is also possible to receive a single reference optical frequency $F_R$ along an optical control channel. The goal is for the reference optical frequency $F_R$ to appear at the center of the main lobe corresponding to the $K^{th}$ optical channel output by the WDD device 228.

To this end, the output of comparator $H_K$ is used to adjust not the reference optical frequency but rather is used to thermally move the WDD device 228 to optimally align the center of its $K^{th}$ lobe with the reference optical frequency $F_R$. This is especially practical when the lobe-to-lobe spacing is consistent between adjacent channels. Advantageously, this allows an absolute frequency plan to be achieved, not just a relative frequency plan, thereby improving the precision of alignment between diverse nodes in the network.

Figure 13:
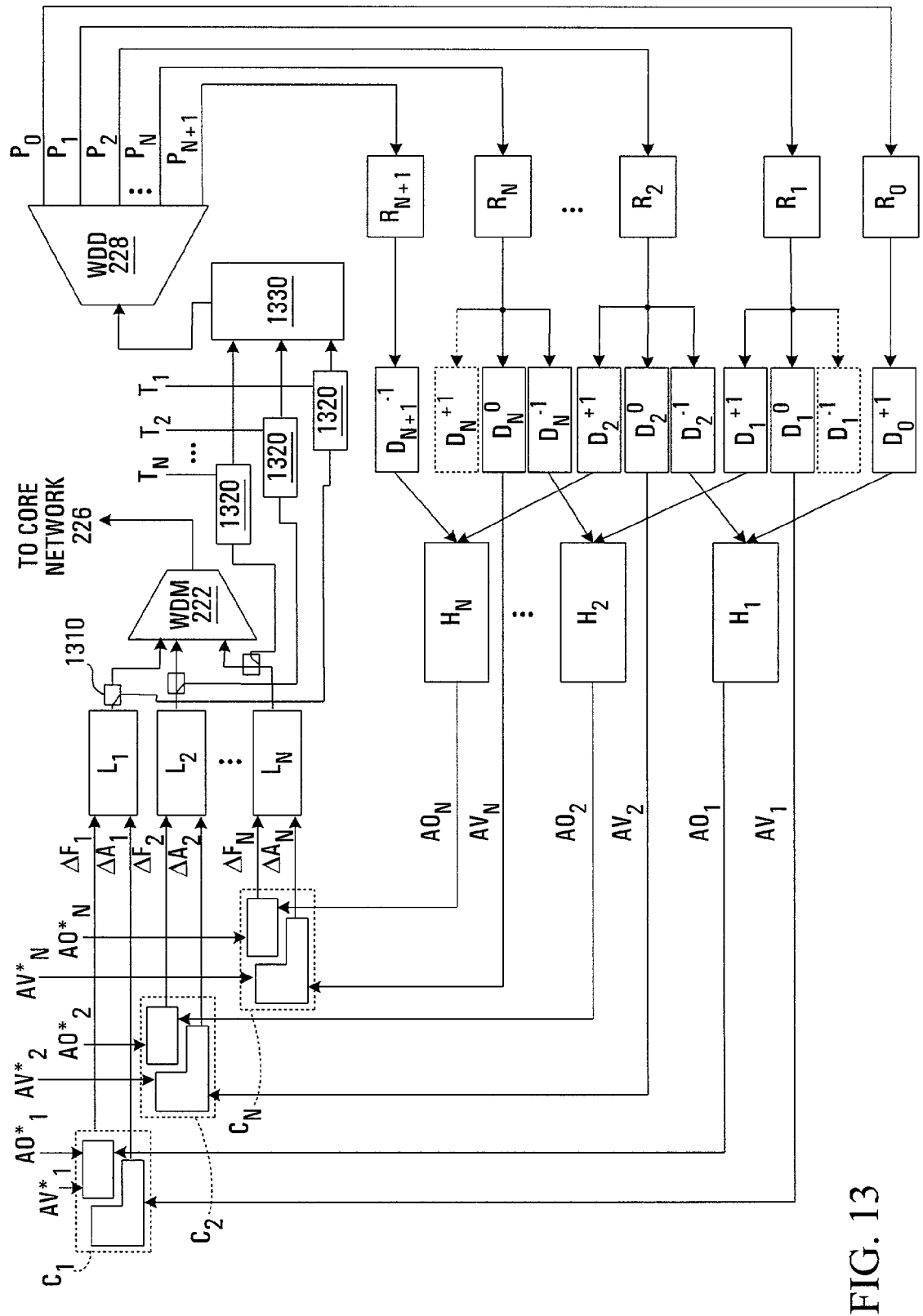
FIG. 13 shows in schematic form a multi-carrier optical signal source in accordance with an eighth embodiment of the present invention.

An eighth embodiment of the invention, shown in FIG. 13, provides for insertion of a modulation signal after generation of the single-carrier optical signals by the lasers $L_i$ but prior to demultiplexing by the WDD device 228. For example, it is within the scope of the present invention to introduce a plurality of splitters 1310, each of which is connected between a respective one of the lasers $L_i$ and the WDM device 222. Each splitter 1310 may suitably divert between 5 and 10% of the optical power of the respective single-carrier optical signal towards a respective modulator 1320, while feeding the rest of the power to the core network 226 via the WDM device 222. Of course, those skilled in the art will appreciate that other power splitting ratios are possible.

Each modulator 1320 applies a modulation signal, suitably a tone at tone frequency $T_i$, to each corresponding single-carrier optical signal. To this end, the modulators 1320 may be suitably embodied as variable optical attenuators (VOAs) based on thermo-optic effects. The outputs of the modulators 1320 are connected to respective inputs of a combiner 1330. The combiner 1330 multiplexes the individual optical signals into a multi-carrier optical signal provided to the input of the WDD device 228.

With this configuration, which may be used with any of the above described embodiments of the invention, the optical signals being transmitted to the core network 226 are free of modulation signals (tones) because such tones are introduced after the signals have been diverted to the core network 226. As a result, large amplitudes for the modulation signals are permitted as there is no associated contamination of the optical carrier signals emitted by the lasers $L_i$. Larger amplitudes are useful as they provide additional robustness and reliability to the measurements made by the comparators $H_i$ and reduce the required sensitivity of the tone detector.

Those skilled in the art will also appreciate that in alternative embodiments of the present invention, the amplitude control loop may be dispensed with in favour of equipping each laser with a known prior art back facet monitor diode and power control loop, while retaining only the frequency control loop. Although this would increase the number of optical components, due to the inclusion, in an N-channel system, of N back facet monitor diodes and independent power control loops, such an implementation is nonetheless within the scope of the present invention. In this way, amplitude equalization of individual optical carriers across the optical frequency spectrum is not provided, although each carrier frequency $F_i$ will be precisely maintained within a close range of its corresponding system frequency $F^*_i$, as long as the amplitude of the optical carrier is sufficiently high.

It should also be understood that although the above embodiments all describe the measured amplitude offset as relying on measurements taken from channels adjacent to the channel in which the optical carrier is expected to lie, it is nevertheless within the scope of the invention to use measurements taken from channels that are even further removed. This may be especially beneficial in situations where the side lobes of an individual channel response demonstrate a significant peak at more distant intervals from the corresponding channel center frequency.

Those skilled in the art should further appreciate that the present invention is not limited to the use of tones as the modulation signals. Thus, use of the expressions "tone frequency" and "tone" herein above has been by way of example only and is merely intended to emphasize the distinction between the electrical characteristics of the modulation signals and the optical characteristics of the signals output by the lasers. Other embodiments may be contemplated in which the modulation signal may have a characteristic that allows it to be isolated and its amplitude measured in the presence of other modulation signals. Examples include signals with unique combinations of tones or with unique but constant modulation depths or even signals with unique phases or digital codes.

Moreover, those skilled in the art should also be appreciative of the fact that embodiments of the invention exist in which the use of modulated signals is not required. For example, if the lasers were quasi-stable under open loop conditions (i.e., $F_i^{open}$ is always in the neighbourhood of $F^*_i$), then the frequency control loop could operate under received d.c. power measurements at all times, thereby allowing the elimination of the modulation signals altogether, with the consequent removal of any tone-related impairments on the output optical carriers.

Figure 14:
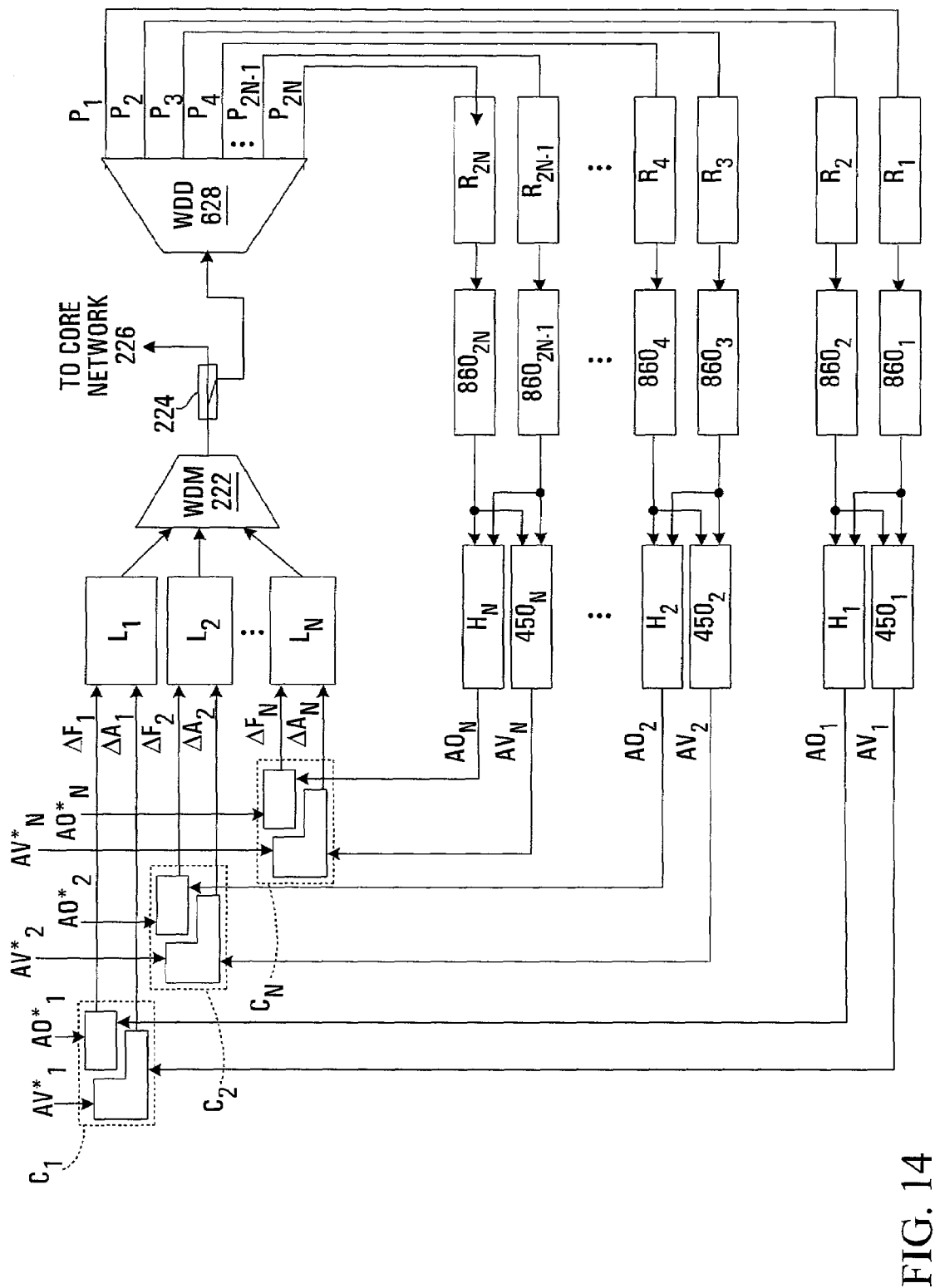
FIG. 14 shows in schematic form a multi-carrier optical signal source in accordance with a ninth embodiment of the present invention.

For example, FIG. 14 shows a ninth embodiment of the present invention which is especially suited to already partially stabilized lasers $L_i$, operating to within about 5–10 GHz of the system frequencies $F^*_i$. An example of a laser operating in this manner is a Fabry-Perot laser associated with a fiber grating to establish the tuning point. Such a part can be tuned about 10–12 GHz over a temperature range of 50 degrees Celsius and can be produced with about 5–10 GHz initial tuning accuracy.

Each of the lasers $L_i$ outputs a single-carrier optical signal which is fed to broad-lobed WDM device 222, which combines the N single-carrier optical signals into a multi-carrier optical signal. The output of the WDM device 222 is connected, via splitter 224, both to the core network 226 and to the WDD device 628. The splitter 224 may suitably divert between 5 and 10% of the optical power of the multi-carrier optical signal towards the WDD device 628, while feeding the rest of the power to the core network 226. Of course, those skilled in the art will appreciate that other power splitting ratios are possible, as are other output-multiplexed (or non output-multiplexed) structures.

The wavelength division demultiplexing (WDD) device 628 has been previously described with reference to FIG. 6. The WDD device 628 has 2N output ports $P_{2i+k}$, $1 \leq i \leq N$, $-1 \leq k \leq 0$. Specifically, each port is associated with an optical channel having an optical pass band centered about a unique channel center frequency $F_{ch,2i+k}$. In the specific embodiment of FIG. 14, the channel center frequencies $F_{ch,2i+k}$ correspond to $F^*_i + ((-1)^k \cdot 25)$ GHz. In other words, system frequency $F^*_i$ falls mid-way between channel center frequency $F_{ch,2i-1}$ and channel center frequency $F_{ch,2i}$.

Each output port $P_{2i+k}$, $1 \leq i \leq N$, $-1 \leq k \leq 0$, of the WDD device 628 is connected to a respective low-bandwidth optical receiver $R_{2i+k}$, $1 \leq i \leq N$, $-1 \leq k \leq 0$, which is adapted to provide opto-electronic conversion functionality. Each of the optical receivers $R_{2i+k}$ outputs a low-bandwidth electrical version of the portion of the multi-carrier optical signal centered about the corresponding channel center frequency $F_{ch,2i+k}$ which, in the embodiment of FIG. 14, corresponds to system frequency $F^*_i$ adjusted by $(-1)^k \cdot 25$ GHz. That is to say, each optical receiver $R_{2i+k}$ admits a low-bandwidth electrical version of the portion of the multi-carrier optical signal centered about $F^*_i + (-1)^k \cdot 25$ GHz.

Each of the optical receivers $R_{2i+k}$, $1 \leq i \leq N$, $-1 \leq k \leq 0$, is connected to a respective power monitor $860_{2i+k}$, $1 \leq i \leq N$, $-1 \leq k \leq 0$. Power monitor $860_{2i+k}$ is adapted to measure the power in the signal admitted by the respective receiver. The outputs of power monitors $860_{2i-1}$, $860_{2i}$ are connected to two inputs of a comparator $H_i$ and to two inputs of a power combiner $450_i$. Thus, it is as if the switch $870_i$ of FIG. 8 always operated in the second state. In other words, comparator Hi evaluates the difference between the power of the optical signal in the channels centered about frequencies $F_{ch,2i-1}$ and $F_{ch,2i}$, while power combiner $450_i$ combines the amplitude measured by power monitor $860_{2i-1}$ and power monitor $860_{2i}$.

The output of each comparator $H_i$, $1 \leq i \leq N$, is the previously described measured amplitude offset $AO_i$, which is fed to laser controller $C_i$ associated with optical carrier i. Also, the output of power combiner $450_i$ is a used as the previously described measured carrier amplitude $AV_i$ which is fed to laser controller $C_i$ associated with optical carrier i. Because tones are not used, the accuracy of the frequency control loop will depend on the tolerance of the WDM device 222, as well as on the precision, sensitivity and balance of the comparators $H_i$.

Those skilled in the art should appreciate that in some embodiments of the invention, all or part of the functionality previously described herein with respect to components such as the tone detectors $D_i$, comparators $H_i$, controllers $C_i$, out-of-range detectors $880_i$, tone detection unit 940 and controller units 950, 1150, may be implemented as pre-programmed hardware or firmware elements (e.g., application specific integrated circuits (ASICs), electrically erasable programmable read-only memories (EEPROMs), etc.), or other related components.

In other embodiments of the invention, all or part of the functionality previously described herein with respect to the tone detectors $D_i$, comparators $H_i$, controllers $C_i$ and out-of-range detectors $880_i$ may be implemented as software consisting of a series of instructions for execution by a computer system. The series of instructions could be stored on a medium which is fixed, tangible and readable directly by the computer system, (e.g., removable diskette, CD-ROM, ROM, or fixed disk), or the instructions could be stored remotely but transmittable to the computer system via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the series of instructions may be written in a number of programming languages for use with many computer architectures or operating systems. For example, some embodiments may be implemented in a procedural programming language (e.g., "C") or an object oriented programming language (e.g., "C++" or "JAVA").

While specific embodiments of the present invention have been described and illustrated, it will be apparent to those skilled in the art that numerous modifications and variations can be made without departing from the scope of the invention as defined in the appended claims.

We claim:

1. An optical signal generator, comprising:
   an optical source adapted to generate an optical signal including a plurality of carrier signals at respective generated carrier frequencies that are adjustable by corresponding frequency control signals, each carrier signal being associated with a respective target carrier frequency;
   a multi-channel optical filter having a filter input port connected to the optical source and having a plurality of filter output ports, each filter output port being associated with a respective optical channel having a pass band surrounding a different respective channel center frequency;
   for each target carrier frequency, a first detection unit and a second detection unit respectively associated with said target carrier frequency, each connected to a different one of the filter output ports, and each adapted to output an indication of a characteristic of said target carrier frequency in the optical signal present at the filter output port to which it is connected, wherein the filter output port connected to one of the first detection unit and the second detection unit respectively associated with a first target carrier frequency is connected to one of the first detection unit and the second detection unit respectively associated with a second target carrier frequency different from the first target carrier frequency; and a control unit connected to the first detection unit and the second detection unit respectively associated with each target carrier frequency and to the optical source, said control unit being operable to generate the frequency control signal corresponding to each particular carrier signal as a function of the output of the first detection unit and the second detection unit respectively associated with the target carrier frequency that is associated with said particular carrier signal, thereby to align the generated carrier frequency of said particular carrier signal with the target carrier frequency associated with said particular carrier signal.

2. An optical signal generator as claimed in claim 1, wherein the first detection unit associated with a particular target carrier frequency is connected to a filter output port associated with an optical channel having a channel center frequency less than the particular target carrier frequency and wherein the second detection unit associated with the particular target carrier frequency is connected to a filter output port associated with an optical channel having a channel center frequency greater than the particular target carrier frequency.

3. An optical signal generator as claimed in claim 2, wherein the optical source is adapted to modulate at least one of the carrier signals in accordance with a modulation signal having a characteristic uniquely associated with the target carrier frequency associated with said carrier signal, and wherein each of the first detection unit and the second detection unit respectively associated with a particular target carrier frequency is adapted to output an indication of the extent to which said characteristic of the modulation signal associated with the particular target carrier frequency appears in the optical signal present at the filter output port to which it is connected.

4. An optical signal generator as claimed in claim 2, wherein the optical source is adapted to modulate at least one of the carrier signals in accordance with a modulation signal uniquely associated with the target carrier frequency associated with said carrier signal, and wherein each of the first detection unit and the second detection unit respectively associated with a particular target carrier frequency is adapted to output the amplitude of the modulation signal associated with the particular target carrier frequency appearing in the optical signal present at the filter output port to which it is connected.

5. An optical signal generator as claimed in claim 4, wherein each modulation signal associated with a different target carrier frequency has a set of at least one unique electrical frequency.

6. An optical signal generator as claimed in claim 3, wherein said control unit comprises a respective comparator connected to the first detection unit and the second detection unit respectively associated with a particular target carrier frequency.

7. An optical signal generator as claimed in claim 6, wherein said comparator is adapted to determine the difference in the amplitude of the modulation signal associated with the particular target carrier frequency as measured in different optical channels, said control unit being further adapted to compare said difference to a pre-determined offset, thereby to generate the frequency control signal corresponding to the carrier signal associated with the particular target carrier frequency.

8. An optical signal generator as claimed in claim 7, wherein said pre-determined offset depends on the response of the optical filter in the pass bands of the optical channels associated with the two different filter output ports to which said first and second detection units are connected.

9. An optical signal generator as claimed in claim 8, wherein said offset is substantially zero.

10. An optical signal generator as claimed in claim 7, wherein the channel center frequencies and the target carrier frequencies are interleaved.

11. An optical signal generator as claimed in claim 7, wherein the channel center frequencies are aligned with the target carrier frequencies.

12. An optical signal generator as claimed in claim 7, wherein at least two channel center frequencies are located between each pair of adjacent target carrier frequencies.

13. An optical signal generator as claimed in claim 1, further comprising a coarse wavelength capture module connected between at least one filter output port and the optical source, said coarse wavelength capture module being adapted to determine whether at least one generated carrier frequency is substantially outside a neighbourhood of the associated target carrier frequency and further adapted to instruct the optical source to adjust such generated carrier frequency until it is determined to be within said neighbourhood of the associated target frequency.

14. An optical signal generator as claimed in claim 13, further comprising an output switch connected to the optical source, for controllably passing selected ones of the carrier signals generated by the optical source to a location external to the optical signal generator, said output switch being controllable by said coarse wavelength capture module to block at least one carrier signal when its associated generated carrier frequency is outside said neighbourhood of the associated target carrier frequency.

15. An optical signal generator as claimed in claim 5, further comprising:
for each of at least one target carrier frequency, a third detection unit respectively associated with said target carrier frequency and connected to the particular filter output port whose associated channel center frequency is closest to said target carrier frequency, wherein the third detection unit associated with a particular target carrier frequency is adapted to output the amplitude of the modulation signal associated with the particular carrier frequency as it appears in the optical signal present at the filter output port to which it is connected;
wherein the control unit is further connected to each third detection unit and wherein the control unit is further operable to adjust the amplitude of a particular carrier signal as a function of the output of the third detection unit associated with the target carrier frequency associated with said particular carrier signal.

16. An optical signal generator as claimed in claim 1, further comprising a power combiner associated with each target carrier frequency, wherein the power combiner associated with a particular target carrier frequency comprises two inputs respectively connected to the first detection unit and the second detection unit respectively associated with the particular target carrier frequency.

17. An optical signal generator as claimed in claim 16, wherein the power combiner associated with a particular target carrier frequency is adapted to determine the total power of a modulation signal associated with the particular target carrier frequency as measured in different optical channels, the control unit being further adapted to adjust the amplitude of the carrier signal associated with the particular target carrier frequency as a function of the output of the power combiner associated with the particular target carrier frequency.

18. An optical signal generator as claimed in claim 17, wherein each of the first detection unit and the second detection unit respectively associated with a particular target carrier frequency comprises a power monitor adapted to measure a power level of the optical signal present at the filter output port to which said detection unit is connected, each of the first detection unit and the second detection unit respectively associated with a particular target carrier frequency being further adapted to provide the respective measured power level to a respective input of the power combiner to which said detection unit is connected.

19. An optical signal generator as claimed in claim 2, wherein the optical source is adapted to modulate at least one of the carrier signals in accordance with a modulation signal having a characteristic uniquely associated with the target carrier frequency associated with said carrier signal;
wherein each of the first detection unit and the second detection unit respectively associated with a particular target carrier frequency includes:
(i) a modulation signal detector adapted to output an indication of the extent to which said characteristic of the modulation signal associated with the particular target carrier frequency appears in the optical signal present at the filter output port to which said detection unit is connected; and
(ii) a power monitor adapted to measure a power level of the optical signal present at the filter output port to which said detection unit is connected;
wherein said control unit includes:
(i) a respective comparator associated with each target carrier frequency; and
(ii) a switch having inputs connected to the modulation signal detector and the power monitor in both the first detection unit and the second detection unit respectively associated with a particular target carrier frequency and having outputs connected to the comparator associated with the particular target carrier frequency, the switch being operable in a first state wherein the output of the modulation signal detectors is provided to the comparator and a second state wherein the output of the power monitors is provided to the comparator.

20. An optical signal generator as claimed in claim 19, wherein the comparator associated with a particular target carrier frequency is adapted to determine the difference between the signals received from the switch to which it is connected, the control unit being further adapted to compare said difference to a pre-determined offset, thereby to generate the frequency control signal corresponding to the carrier signal associated with the particular target carrier frequency.

21. An optical signal generator as claimed in claim 20, each switch being operable to change states as a function of the stability of the difference determined by the comparator to which said switch is connected.

22. An optical signal generator as claimed in claim 20, further comprising a power combiner associated with each of at least one target carrier frequency, wherein the power combiner associated with a particular target carrier frequency comprises two inputs connected to the outputs of the switch connected to the first and second detection units associated with the particular target carrier frequency.

23. An optical signal generator as claimed in claim 22, wherein the power combiner associated with a particular target carrier frequency is adapted to determine an estimate of the total power of the modulation signal associated with the particular target carrier frequency as measured in different optical channels, the control unit being further adapted to adjust the amplitude of the carrier signal associated with the particular target carrier frequency as a function of the output of the power combiner associated with the target carrier frequency associated with the particular carrier signal.

24. An optical signal generator as claimed in claim 1, wherein the optical source comprises an optical multiplexer for combining the carrier signals into a composite optical signal, said optical multiplexer having an output port connected to the filter input port.

25. An optical signal generator as claimed in claim 1, further comprising a plurality of receivers, each receiver being connected between a respective one of the filter output ports and one of the first detection unit and the second detection unit respectively associated with a respective target carrier frequency and being adapted to provide optoelectronic conversion of an optical signal received from said respective one of the filter output ports into an electrical signal provided to the said one of the first detection unit and the second detection unit respectively associated with said respective target carrier frequency.

26. An optical signal generation apparatus, comprising:
a plurality of optical signal generators as claimed in claim 1;
each said optical signal generator further comprising a switch for controllably allowing selected ones of the carrier signals to exit said optical signal generator;
the control units of said optical signal generators being interconnected and each being further adapted to control the respective switch in order to ensure that the carrier signal associated with each target carrier frequency is allowed to exit at most one of said optical signal generators; and
a combiner for combining the carrier signals exiting the plurality of optical signal generators.

27. Apparatus for stabilizing respective optical carrier frequencies of a plurality of generated carrier signals with respect to respective target carrier frequencies, each generated carrier signal being associated with a respective target carrier frequency, the plurality of carrier signals being included in an optical signal generated by an optical source, the optical source being adapted to adjust the respective optical carrier frequency of each generated carrier signal in accordance with a corresponding frequency control signal, said apparatus comprising:
a multi-channel optical filter having a filter input port for connection to the optical source and having a plurality of filter output ports, each filter output port being associated with a respective optical channel having a pass band surrounding a different respective channel center frequency;
for each target carrier frequency, a first detection unit and a second detection unit respectively associated with said target carrier frequency, each connected to a different one of the filter output ports, and each adapted to output an indication of a characteristic of said target carrier frequency in the optical signal present at the filter output port to which it is connected, wherein the filter output port connected to one of the first detection unit and the second detection unit respectively associated with a first target carrier frequency is connected to one of the first detection unit and the second detection unit respectively associated with a second target carrier frequency different from the first target carrier frequency; and a control unit for connection to the optical source and connected to the first detection unit and the second detection unit respectively associated with each target carrier frequency, said control unit being operable to generate the frequency control signal corresponding to each particular generated carrier signal as a function of the output of the first detection unit and the second detection unit respectively associated with the target carrier frequency that is associated with said particular generated carrier signal, thereby to stabilize the optical carrier frequency of said particular generated carrier signal with respect to the target carrier frequency associated with said particular generated carrier signal.

* * * * *